US008352574B2

(12) United States Patent
Kwon

(10) Patent No.: US 8,352,574 B2
(45) Date of Patent: Jan. 8, 2013

(54) ONLINE HUMAN NETWORK MANAGEMENT SYSTEM AND METHOD FOR STIMULATING USERS TO BUILD VARIOUS FACES OF RELATION

(75) Inventor: Oh Sung Kwon, Seoul (KR)

(73) Assignee: NHN Corporation, Seongnam-si (KR)

( * ) Notice: Subject to any disclaimer, the term of this patent is extended or adjusted under 35 U.S.C. 154(b) by 193 days.

(21) Appl. No.: 11/971,394

(22) Filed: Jan. 9, 2008

(65) Prior Publication Data

US 2008/0147884 A1 Jun. 19, 2008

Related U.S. Application Data

(63) Continuation of application No. PCT/KR2006/002747, filed on Jul. 13, 2006.

(30) Foreign Application Priority Data

Jul. 13, 2005 (KR) ........................ 10-2005-0063147

(51) Int. Cl.
*G06F 15/16* (2006.01)
*G06F 17/30* (2006.01)

(52) U.S. Cl. ........ 709/218; 709/219; 707/741; 707/713; 707/781

(58) Field of Classification Search .......... 709/220–222; 707/100–104.1; 715/700–759
See application file for complete search history.

(56) References Cited

U.S. PATENT DOCUMENTS

| | | | | |
|---|---|---|---|---|
| 6,016,485 | A * | 1/2000 | Amakawa et al. | 705/400 |
| 6,038,509 | A * | 3/2000 | Poppen et al. | 701/210 |
| 6,324,541 | B1 * | 11/2001 | de l'Etraz et al. | 1/1 |
| 6,351,745 | B1 * | 2/2002 | Itakura et al. | 1/1 |
| 6,775,267 | B1 * | 8/2004 | Kung et al. | 370/352 |
| 6,879,985 | B2 * | 4/2005 | Deguchi et al. | 1/1 |
| 7,440,749 | B2 * | 10/2008 | Muto | 455/414.1 |
| 7,539,697 | B1 * | 5/2009 | Akella et al. | 1/1 |
| 7,716,140 | B1 * | 5/2010 | Nielsen et al. | 705/319 |
| 2003/0065580 | A1 * | 4/2003 | Obata et al. | 705/26 |
| 2003/0167324 | A1 * | 9/2003 | Farnham et al. | 709/224 |
| 2004/0148275 | A1 * | 7/2004 | Achlioptas | 707/3 |
| 2005/0015445 | A1 * | 1/2005 | Chudnovsky et al. | 709/204 |
| 2009/0024548 | A1 * | 1/2009 | Zhu et al. | 706/21 |
| 2009/0063630 | A1 * | 3/2009 | Obasanjo et al. | 709/204 |
| 2009/0259944 | A1 * | 10/2009 | Wu | 715/738 |

FOREIGN PATENT DOCUMENTS

| | | |
|---|---|---|
| KR | 2000-36287 | 7/2000 |
| KR | 2003-36277 | 5/2003 |
| KR | 2005-33995 | 4/2005 |

* cited by examiner

*Primary Examiner* — Joseph Avellino
*Assistant Examiner* — Aftab Nasir Khan
(74) *Attorney, Agent, or Firm* — H.C. Park & Associates, PLC

(57) ABSTRACT

The present invention provides the steps of maintaining a first database containing profiles of a plurality of users in a network; maintaining a second database containing relationship index between some of the users wherein the relationship index is determined based upon degree of correspondence relationship between the users; forming a social network comprising a plurality of nodes and a plurality of links between at least some of the nodes, in association with the relationship index stored in the second database; upon receipt of a request from a first user, searching for at least one route connecting the first user to a second user in the social network based, at least in part, upon said existing links and the relationship index of the links; and evaluating each of the searched routes based, at least in part, upon the relationship indexes of the links which form said respective searched routes.

19 Claims, 25 Drawing Sheets if $R_{i-j} = 0 \rightarrow C(i, j) = 0$

ONLINE HUMAN NETWORK MANAGEMENT SYSTEM AND METHOD FOR STIMULATING USERS TO BUILD VARIOUS FACES OF RELATION

CROSS-REFERENCE TO RELATED APPLICATION

This application is a continuation of prior International Application PCT Application No. PCT/KR2006/002747 filed on Jul. 13, 2006, which claims the benefit of priority from Korean Patent Application No. 10-2005-0063147 filed on Jul. 13, 2005. The disclosures of International Application PCT Application No. PCT/KR2006/002747 and Korean Patent Application No. 10-2005-0063147 are incorporated herein by reference.

BACKGROUND OF THE INVENTION

1. Field of the Invention

The present invention relates, in general, to a system and method for building and managing a human network or a social network through a network, such as Internet, and, more particularly, to a system and method in which users can establish acquaintance relationship with various parties in various relationship levels through a network, set relationship indexes are reflected, a hidden user, which is worth as the shortest bridge when a new acquaintance relationship is established, are searched for and provided with information required for relationship establishment, so that not only a superficial optimal route, for which is searched through established acquaintance relationships, but also an potential optimal route, which may established through un-established acquaintance relationships, are effectively used, and relationships having low danger are established, thereby promoting the building of a more stable and effective on-line human network.

2. Description of Related Art

Networks, such as wired/wireless Internet, or Intranet, have been widely used as popularized communication means already, on the basis of which means, such as world wide webs, e-mails or messengers, which enable members of a society to share information to obtain knowledge, has been actively used.

Recently, Internet services which not only use networks as communication means but also enable the building of an on-line human network using the networks are actively provided. The human network refers to a virtual network, members of which are individuals having acquaintance relationship with each other through social life. The acquaintance relationship refers to the others which considerably share information, experience, ideal and belonging to a community with each other, thereby fairly putting confidence in each other. In a general social life, such acquaintance relationships are derived from previously determined acquaintance relationships, blood relationships and alumni relationships or regional relationships, or are established, when users belong to a specific community or perform a common affair through a company or a team, thereby knowing each other.

Recently, with the development and spread of networks, such as Internet, it is possible to establish and maintain such acquaintance relationships on line. Various service technologies which support the active building of such a human network between users, create a database based on the build human network, and enable searching for humans having desired ability and experience based on the database, new establishment of relationships with new acquaintances based on the on-line human network, expanding of each user's own human network based on the relationship, or sharing various files and information, are proposed.

In the building and management technologies of an on-line human network, according to the characteristic of a network, such as Internet accessible by unspecific users, to ensure the reliability of human relationship, to enable the building of a large area of human network and to minimize a vexatious procedure required to be provided with service are main goals for the technology development of a corresponding field.

A currently used system of building and managing the on-line human network includes the form of accessing a web server, such as a club or a community and being provided with service, and the form of installing a predetermined application program in a terminal and being provided with service while continuously communicating with a server.

In the conventional system of building and managing the on-line human network, it is general that a user requests the establishment of online relationship with another user, which accesses a network, through an means such as an e-mail, a messenger message or a pop-up message, and the another user, upon receipt of the request, responds to the same. According to the relationship of 1:1 between two users, established as described above, respective users are incorporated into an on-line human network built between the other users having the separate relationship of 1:1 with the respective uses.

When the incorporation into the on-line human network is completed, a desired human (for example, an alumnus or a human having a specific occupation) can be searched for among users (a first acquaintance relationship) which have relationship with each other, other users (a second acquaintance relationship) which have the first acquaintance relationship with the acquaintances, and still other users which continuously are connected to each other through them, and, therefore, the found user can be introduced or the establishment of a new acquaintance relationship can be requested.

FIG. 1 is a diagram illustrating a conventional human network search system 100. The illustrated human network search system 100 is constructed by including a database (DB)(10) and a search server 20. A user DB 12 and relationship information DB 14 are included in the database 10. The human network search system 100 is connected to a plurality of user terminals 310, 320, 330, and 340 via a network 200, such as wired/wireless Internet or Intranet. For convenience, only four user terminals are illustrated, and each of user terminals may be any one of various fixed or mobile terminals, such as a laptop, a desktop, a Personal Digital. Assistant (PDA) and a PCS.

A procedure of registering users is described below. First, a step A of registering a first user with the human network search system 100 through the first user's terminal 310 is performed, and a step B of registering a fourth user with the human network search system 100 through the fourth user's terminal 340 is separately performed. In the registration steps, the ID, password and personal information (occupation, gender, age, home address, office address, company name, educational history, hobby and the like) may be provided, and such user information is converted into a predetermined data structure which is stored in the user DB 12 and managed. At the time of registration and subscription (A, B) to services of each user, the human network search system 100 may download a predetermined application program which enable a user to easily use several functions provided from the search system in conjunction with the system, to be executed.

FIG. 2 is a diagram illustrating a step of establishing correspondence relationship (primary acquaintance relationship) between respective users in the conventional human network search system 100. In order to establish on-line primary acquaintance relationship between users, a step D in which the first user transmits an invitation message to the terminal 330 of a second user through the first user's terminal 310, and the fourth user checks this through the fourth user's terminal 340 and transmits an acceptance message may be performed.

Such an invitation message and an acceptance message may have various forms, such as e-mails, short messages or the like. The human network search system 100 recognizes that the invitation and approval steps are performed, and recodes the fact that a correspondence relationship between two users has been established in the relationship information DB 14 in a predetermined data structure at step E. At this time, the fourth user may be a user which is unregistered yet. In this case, a step of registering a user with the system through data transmission and reception with the human network search system 100 can be performed simultaneously with the transmission of the approval message for invitation.

FIG. 3 is a diagram illustrating a step of searching a human network in the conventional human network search system 100. When a request for setting a predetermined condition and searching the human network through the first user's terminal 310 is received at step H, the search server 20 of the system 100 reads data recorded in the user DB 12 and the relationship information DB 14, transforms the data, loads the data in a memory module, included in the search server 20, and performs searching using the loaded data.

FIG. 4 illustrates a data structures inside the user DB 12. As illustrated, user information, such as the name, age, occupation, or gender of a user, is corresponded to each user ID (Userid 1, 2, 3 or the like) and stored in the user DB 12.

FIG. 5 illustrates a data structures inside the relationship information DB 14. As illustrated, the IDs of users, in which the correspondence relationship (primary acquaintance relationship) are established, can be corresponded to each other with 1:1 and stored in the relationship information DB 14.

FIG. 6 illustrates a schematic diagram explaining the search space of an on-line human network. In the virtual search space of the human network, each user registered with a system is corresponding to each node (a, b, c, d, or e). Based on the correspondence relationship between users, links or edges are formed between the nodes of the search space. The formed search space can be represented in a graph data structure. On such a search space, a start node a from which searching starts is defined.

In the illustrated example, users within a secondary acquaintance relationship on the search start node a are illustrated, and, when a user requests searching for users satisfying a specific condition (for example, patent attorney) within the secondary acquaintance relationship, the searching is performed within the illustrated range.

FIG. 7 is a diagram illustrating the result of performing searching for a shortest route within the search space of the on-line human network. It is the case in which a user requests searching for the shortest route (the number of nodes on the route is lowest) between node a corresponding to a user and node p corresponding to a designated another user. As a result, the shortest route (a-b-e-j-p) are searched for within the search space of the human network and displayed to the user.

However, in a conventional human network management system, it is only possible to set the acquaintance relationship of 1:1 and is impossible to set various relationship levels (difference in familiarity, difference in reliability depending on parties, and the degree of familiarity or the like), so that it is impossible to provide different pieces of information depending on the difference between relationship levels, and the leak of personal information is worried in the case in which the drain of its own information is concerned upon establishment of relationship with a unreliable party on-line, thereby being reluctant to build a wide on-line human network.

Furthermore, demands, inquiries and requests are concentrated upon a user which is very active on a network and establishes a large number of networks, thus being robbed of the user's time. The corresponding user eventually withdraws from the human network on-line to avoid the problem, so that a problem occurs in that the on-line human network, which has been established with the user as the central figure, collapses.

BRIEF SUMMARY OF THE INVENTION

Accordingly, the present invention has been made keeping in mind the above problems occurring in the prior art, and relates to the improvement invention of Korean application No. 10-2005-021274(filed on Mar. 15, 2005, and entitled "On-line Human Network Management System and Method for Promoting Establishment of Many-sided Relationship) which is proposed by the present invention and is pending. An object of the present invention is to provide an on-line human network management system and a method there for in which search for information required for establishment of new relationship from previously established correspondence relationship and provide it in order to set new acquaintance relationship, and, if required, search for information required for establishment of new relationship on a potential route on which correspondence relationship has been not established yet in a system which builds and manages the human network so as to enable setting various relationship levels as real life on line, thereby promoting not only users having relationship with many users but also users having correspondence relationship with a few user to stably and efficiently build an on-line human network.

Another object of the present invention is to provide an on-line human network management system and a method therefore which employ a cost concept for respective found routes upon search through the on-line human network and assign weights to relationships (links) between each two users (nodes), and provide an optimal route of various search routes.

A further object of the present invention is to provide an on-line human network management system and a method therefore which, in order to increase opportunity of ensuring low-cost routes, determine weights to be assigned to relationships (links) between each two users on the human network depending on the levels of the relationships between the users, and enables the degree of reliability between users existing on the route to have an effect on the search of an optimal route, thereby promoting the establishment of various relationships with other users in the various relationship levels.

A still further object of the present invention is to provide an on-line human network management system and a method therefore which promotes the establishment of various faces of relationships, thereby resulting in the balanced development of the on line human network, unlike the prior art in which relationships, demands and inquiries are concentrated upon a user because links and nodes are distributed with a user, which is very active on a network and establishes a large number of networks, as the central figure.

In order to accomplish the above objects, in a management method of human network performed in a search server connected with a terminal of multi user through a network, the method for managing a human network through a network according to a first characteristic of the present invention provides the method comprising the steps of maintaining a first database, the first database containing profiles of a plurality of users in a network; maintaining a second database, the second database containing relationship index between some of the users wherein the relationship index is determined based, at least in part, upon degree of correspondence relationship between the users; forming a social network, the network comprising a plurality of nodes and a plurality of links between at least some of the nodes, in association with the relationship index stored in the second database; upon receipt of a request from a first user, searching for at least one route connecting the first user to a second user in the social network based, at least in part, upon said existing links and the relationship index of the links; and evaluating each of the searched routes based, at least in part, upon the relationship indexes of the links which form said respective searched routes. At least some of the nodes are the users and each of the links is a virtual connection path between two users who have correspondence relationship.

The route can be a virtual route which comprises at least one link which was previously created between two nodes due to the correspondence relationship of the respective two nodes; and at least one link which has not been created between two nodes. Or, the route can be an existence route which consists of a plurality of links which were previously created between two nodes due to the correspondence relationship of the respective two nodes. At least one of the routes is a virtual route which comprises at least one link which was previously created between two nodes due to the correspondence relationship of the respective two nodes; and at least one link which has not been created between two nodes, and at least one of the routes is an existence route which consists of a plurality of links which were previously created between two nodes due to the correspondence relationship of the respective two nodes The step of recording a relationship index R includes a step of determining the relationship index R through the designation of any one of two users which have the correspondence relationship, and recording the relationship index R to the relationship information DB, or updating the relationship index R based on the number of the exchanges, such as, message transmission and reception between users having the correspondence relationship, through a network, thereby reflecting the relationship establishment and development process of real life.

The on-line human management method further includes the step of performing a static route search where one or more existence routes which exist between the first user and the second user on the human network is searched such that the evaluation on the one or more existence routes is performed according to the relationship index R reflected in each link on the existence routes to provide the result of the evaluation to the first user.

The dynamic route search is preferably performed, as to the second user selected by the first user, on one or more virtual routes from nodes existing in a first relationship layer of the second user, thereby reducing the load of a system. Furthermore, an evaluation result for one or more virtual routes is compared with an evaluation result for an optimal route of one or more actual routes found in the static route search step, and, based on the comparison result, the evaluation result for virtual routes may be provided to the first user.

Preferably, the route searching step comprises the step of calculating and providing the cost of the each routes according to the summation of a weight on one or more links in each of the routes by assigning the weight which is in inverse proportion to the relationship index R between two user nodes having the correspondence relationship in each of the routes to the link.

The on-line human network management system according to a second characteristic of the present invention comprises a first database containing profiles of a plurality of users in a network; a second database containing relationship index between some of the users; and a search module configured for searching for at least one route connecting a first user to a second user in the social network based, at least in part, upon links which connect nodes and the relationship indexes of the links and for evaluating each of the searched routes based, at least in part, upon the relationship indexes of the links which form said respective searched routes. The relationship index is determined based, at least in part, upon degree of correspondence relationship between the users. At least some of the nodes are the users and each of the links is a virtual connection path between two users who have correspondence relationship.

According to the present invention, a specific technology means, which searches for information required for establishment of new relationship from previously established correspondence relationship and provides it in order to set new acquaintance relationship, and, if required, searches for information required for establishment of new relationship on a potential route on which correspondence relationship has been not established yet, thereby promoting not only users having relationship with many users but also users having correspondence relationship with a few user to stably and efficiently build an on-line human network, is secured, and the patterns of acquaintance relationships can be diverse on line.

Additionally, according to the present invention which employ a cost concept for respective found routes upon search through the on-line human network, weights are assigned to relationships (links) between each two users (nodes), and an optimal route of various search routes is provided so that the success possibility of the establishment of relationship is improved, thereby the establishment of the on line human network being promoted.

According to the present invention, weights to be assigned to relationships (links) between each two users on the human network are determined depending on the levels of the relationships between the users, in order to increase opportunity of ensuring low-cost routes, and the degree of reliability between users existing on the route is caused to have an effect on the search of an optimal route, thereby promoting the establishment of various relationships with other users in the various relationship levels.

Additionally, according to the present invention, the establishment of various faces of relationships is promoted, thereby resulting in the balanced development of the on line human network, unlike the prior art in which relationships, demands and inquiries are concentrated upon a user because links and nodes are distributed with a user, which is very active on a network and establishes a large number of networks, as the central figure.

DESCRIPTION OF REFERENCE CHARACTERS OF PRINCIPAL ELEMENTS

Figure 1:
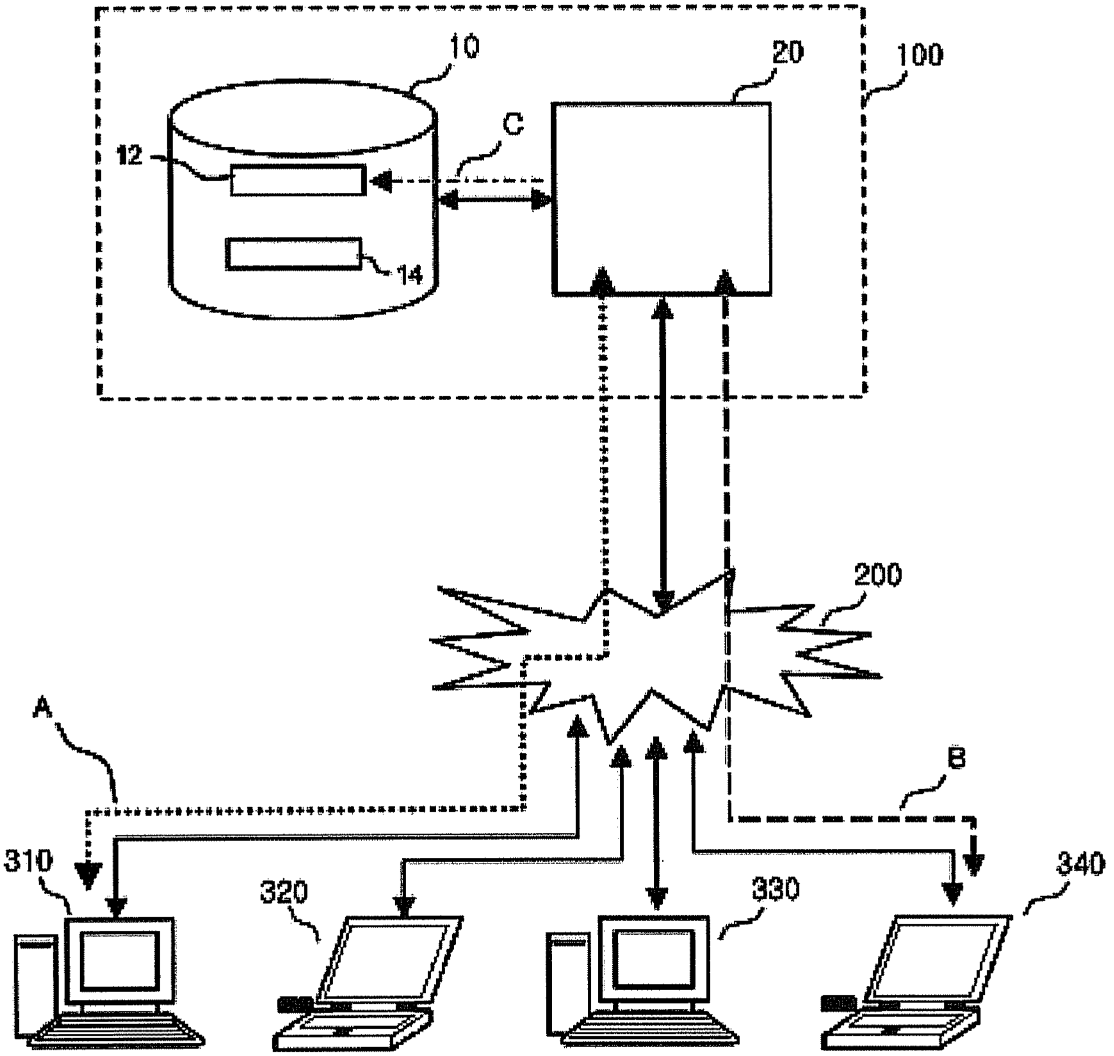
Fig. 1 (PRIOR ART)
FIG. 1 is a diagram illustrating a conventional human network search system 100.
Figure 2:
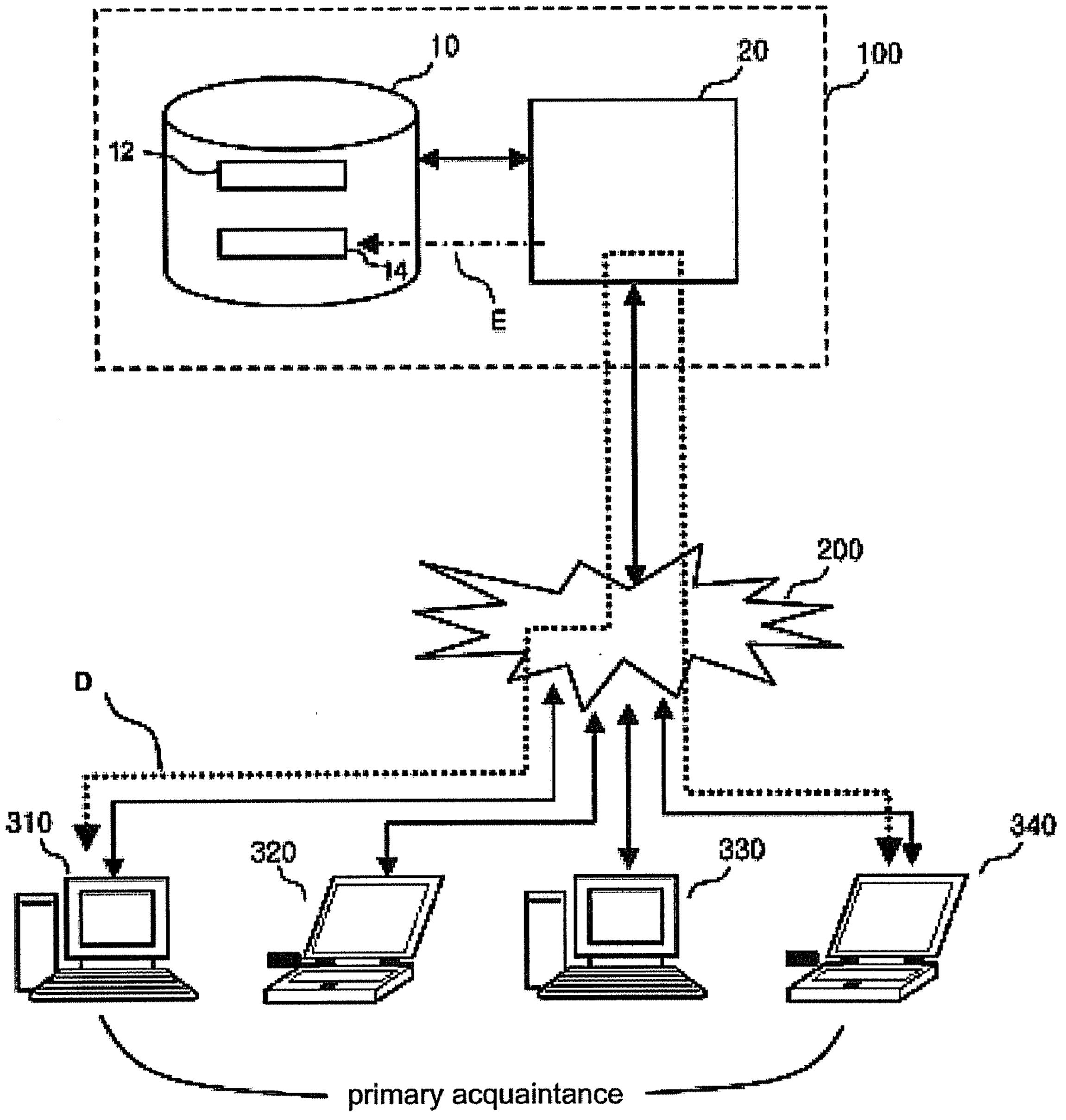
Fig. 2 (PRIOR ART)
FIG. 2 is a diagram illustrating a step of establishing correspondence relationship (primary acquaintance relationship) between respective users in the conventional human network search system 100.
Figure 3:
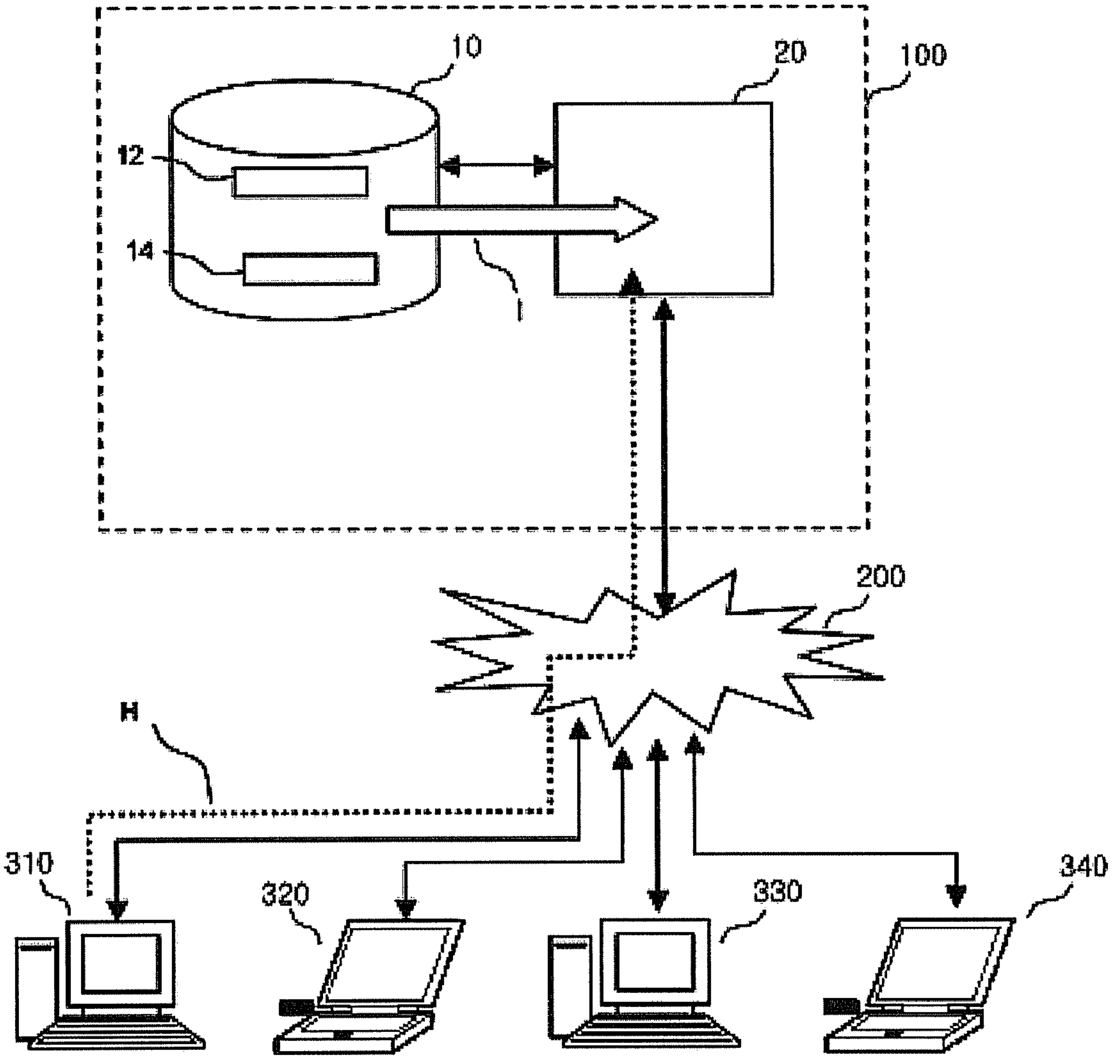
Fig. 3 (PRIOR ART)
FIG. 3 is a diagram illustrating a step of searching a human network in the conventional human network search system 100.
Figure 4:
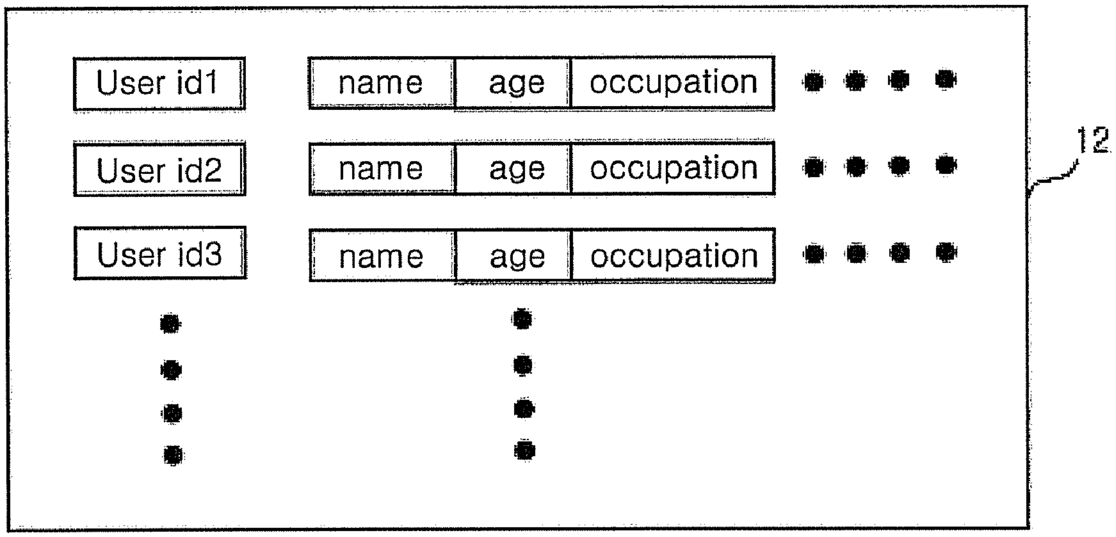
FIGS. 4 and 5 are diagrams respectively illustrating data structures of a user DB 12 and a relationship information DB 14.
Figure 5:
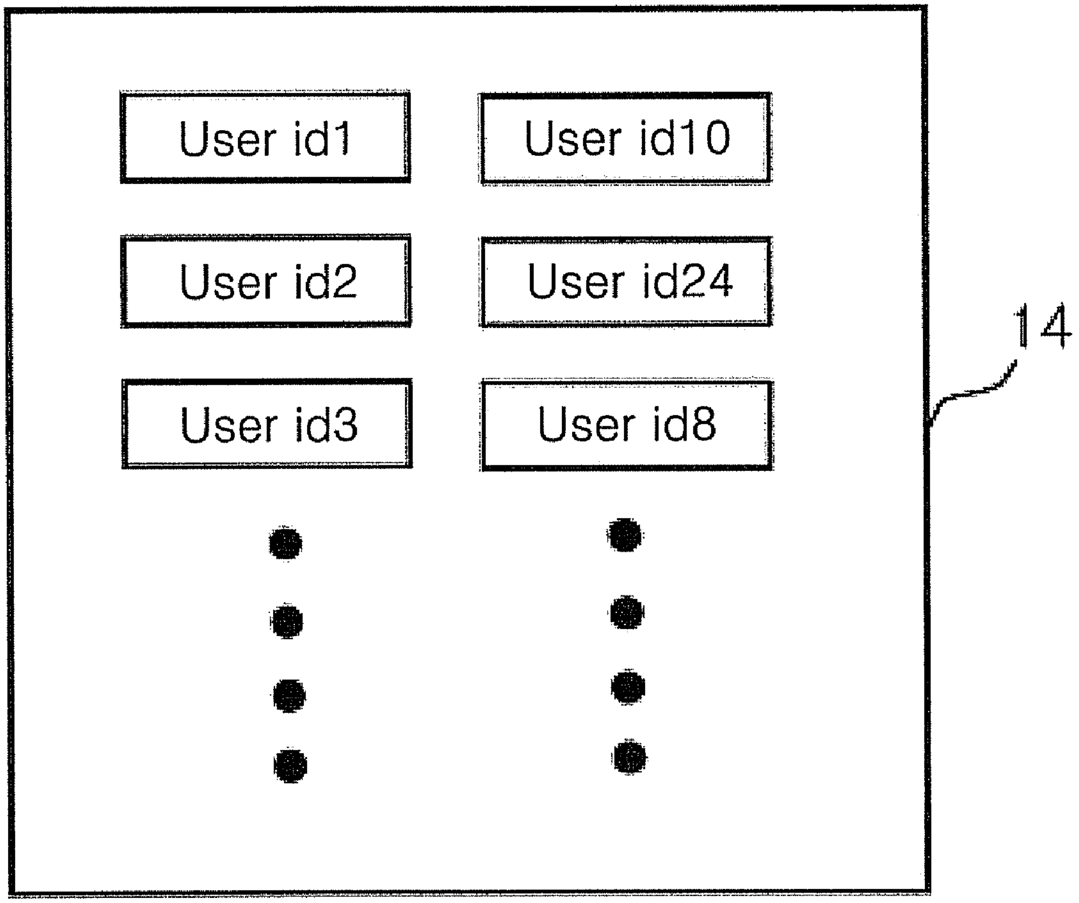
Figure 6:
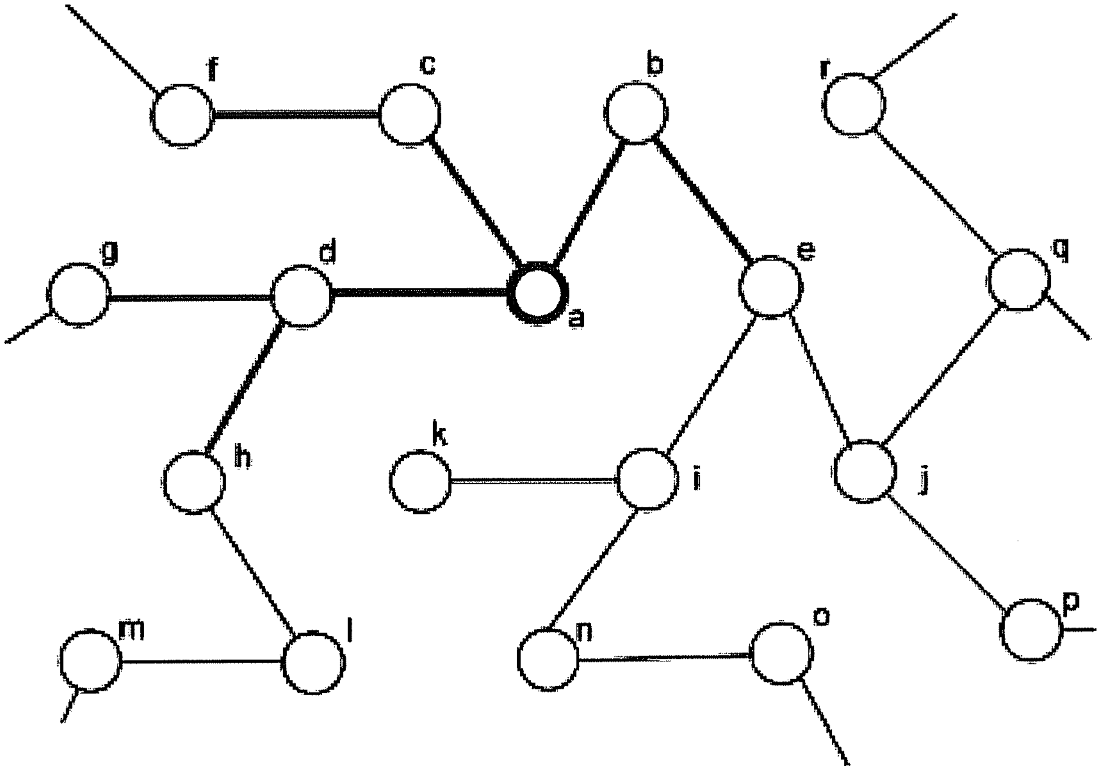
FIG. 6 is a schematic diagram explaining the search space of an on-line human network.
Figure 7:
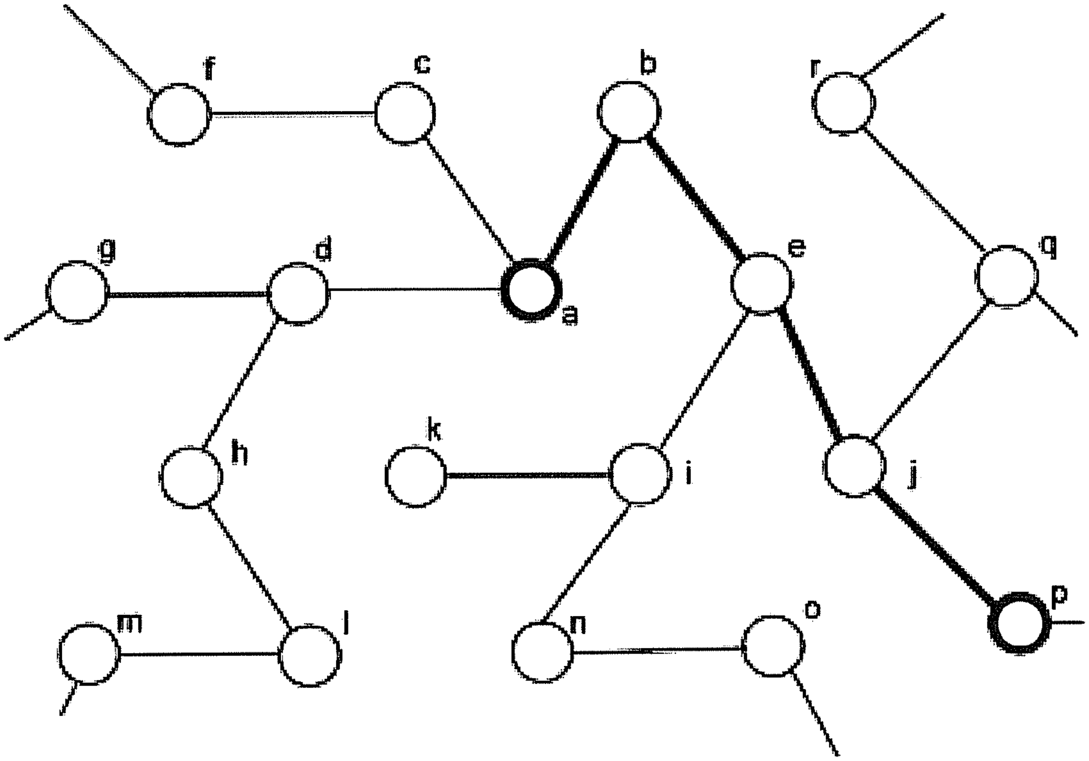
FIG. 7 is a diagram illustrating the result of performing searching for a shortest route within the search space of the on-line human network.

10: database
12: user DB
14: relationship information DB
20: search server
100: human network management system
200: network
310, 320, 330, 340: user terminal

DESCRIPTION OF EXEMPLARY EMBODIMENTS

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

As used in this application, the terms "module" and "system" are intended to refer to a computer-related entity, either hardware, a combination of hardware and software, software, or software in execution. For example, a module can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a module. One or more modules can reside within a process and/or thread of execution, and a module or component can be localized on one computer and/or distributed between two or more computers.

As used herein, the terms "desktop," "PC," "local computer," and the like, refer to computers on which systems (and methods) according to the invention operate. In the illustrated embodiments, these are personal computers, such as portable computers and desktop computers; however, in other embodiments, they may be other types of computing devices (e.g., workstations, mainframes, personal digital assistants or PDAs, music or MP3 players, and the like).

Figure 28:
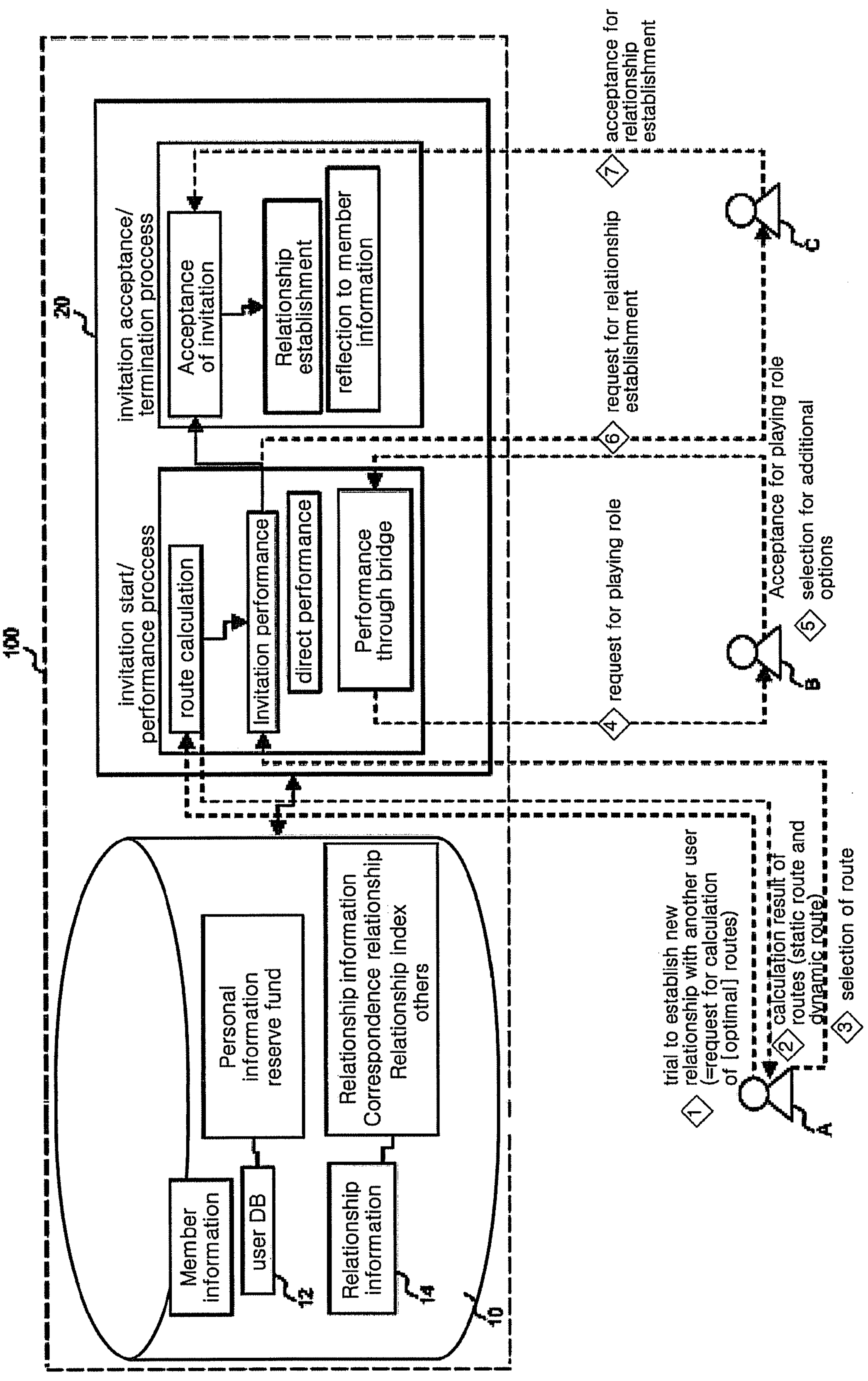
FIG. 28 illustrates the construction of an embodiment of an online human network management system 100 according to the present invention and a data processing process.

The best arrangement for implementation of the present invention is illustrated in FIG. 28. FIG. 28 illustrates the construction of an embodiment of an on-line human network management system 100 according to the present invention and a data processing process. A search server 20 builds a user DB 12 and a relationship information database 14 in the database 10 and manages them. The ID, personal information and assigned a reserve fund of each user may be recorded in the user DB 12. Furthermore, the correspondence relationship (or acquaintance relationship) between respective users, the relationship index between two users, and information exchange of two users or the number of relationship activities representing the number of data transmission and reception may be recorded in the relationship information database 14.

The search server 20 basically performs a function of searching for another user on the on-line human network which satisfies a predetermined condition, and providing the search result to a user requesting the search, and, besides this function, calculating respective route cost in which the relationship indexes described in the present invention are reflected thereby enabling a relative comparison for each route. User A which wants to establish relationship with user C can select an optimal route based on the route costs provided from the search server 20, and can deliver a message requesting the establishment of relationship directly or through another user (bridge, user B in the illustrated drawing). When user B on the middle stage of a route permits oneself to be an introducer, the message requesting the establishment of relationship is delivered to user C. When user C consent to the establishment of relationship, the search server 20 performs the update of information about an account of the user and a correspondence relationship according to the establishment of new relationship to update the user DB 12 and the relationship information DB 14.

Preferred embodiments of the on-line human network management method and system according to the present invention are described in detail with reference to the accompanying drawings below.

Figure 8:
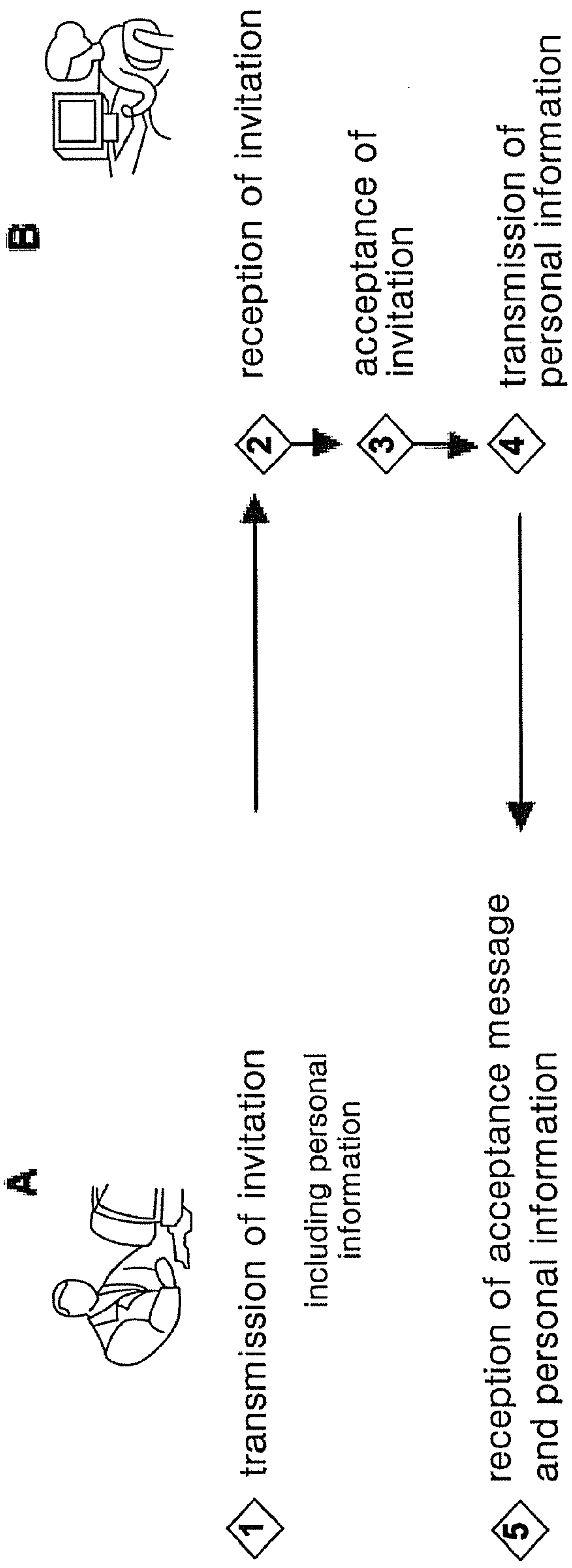
FIG. 8 illustrates a process of establishing correspondence relationships in a conventional human network management method.

FIG. 8 illustrates a process of establishing correspondence relationships in a conventional human network management method. When user A sends out an invitation including personal information for introduction oneself through a terminal, user B receives the invitation in its own terminal via a search server, and, when the invitation is accepted, transmits an acceptance message along with its own personal information.

Figure 9:
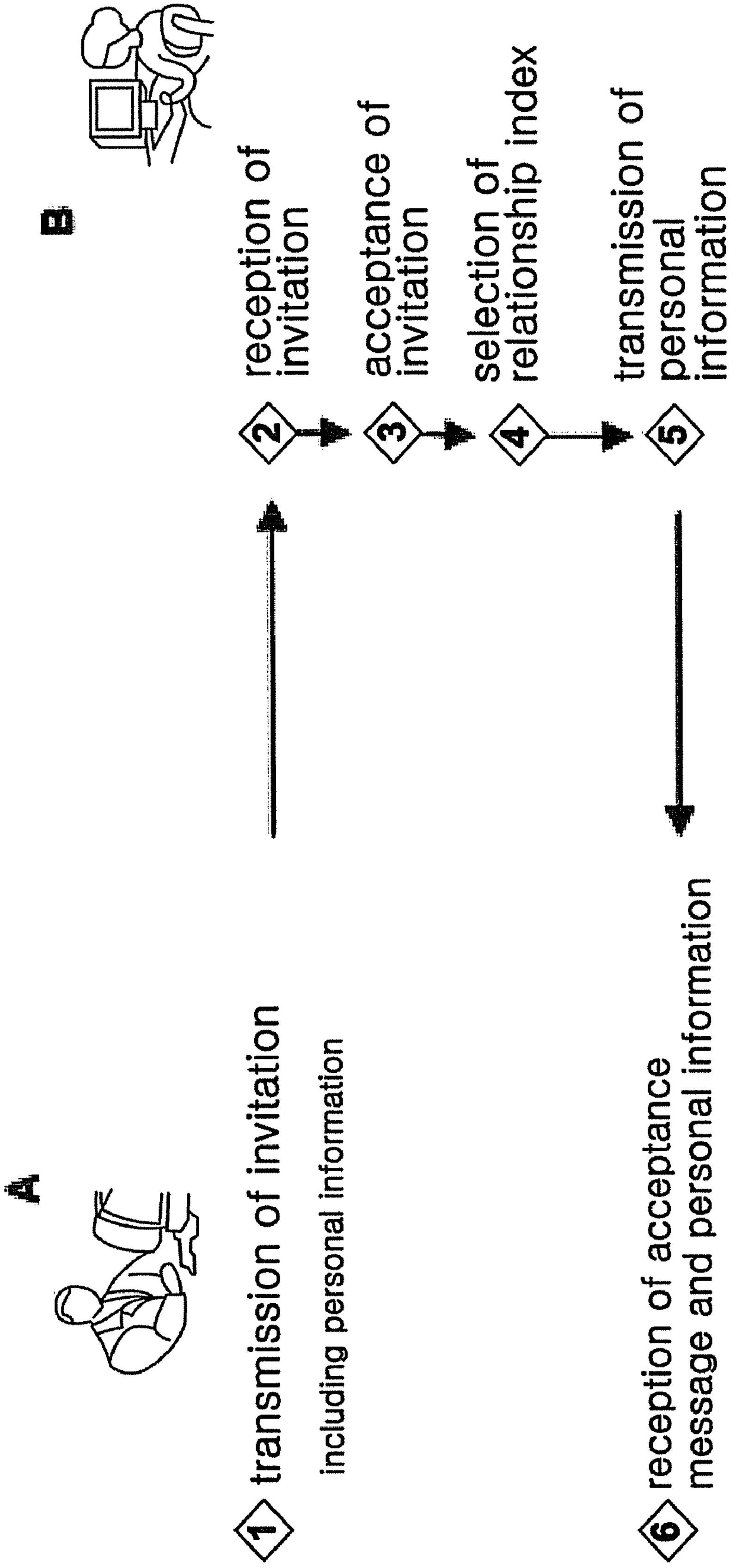
FIG. 9 illustrates a process of establishing correspondence relationships in the human network management method of the present invention.

FIG. 9 illustrates a process of establishing correspondence relationships in the human network management method of the present invention. Unlike the above-described conventional method, the present invention is characterized in that user A which wants to establish correspondence relationship and then sends out an invitation, or a recipient, that is, user B, sets relationship indexes (R) between the two users. The relationship index defined by the present invention refers to a concept corresponding to familiarity or reliability between acquaintances in real life. The present invention sets the relationship indexes representing the familiarity or reliability between two parties which try to establish correspondence relationship, and records it in the relationship information DB 14.

Figure 10:
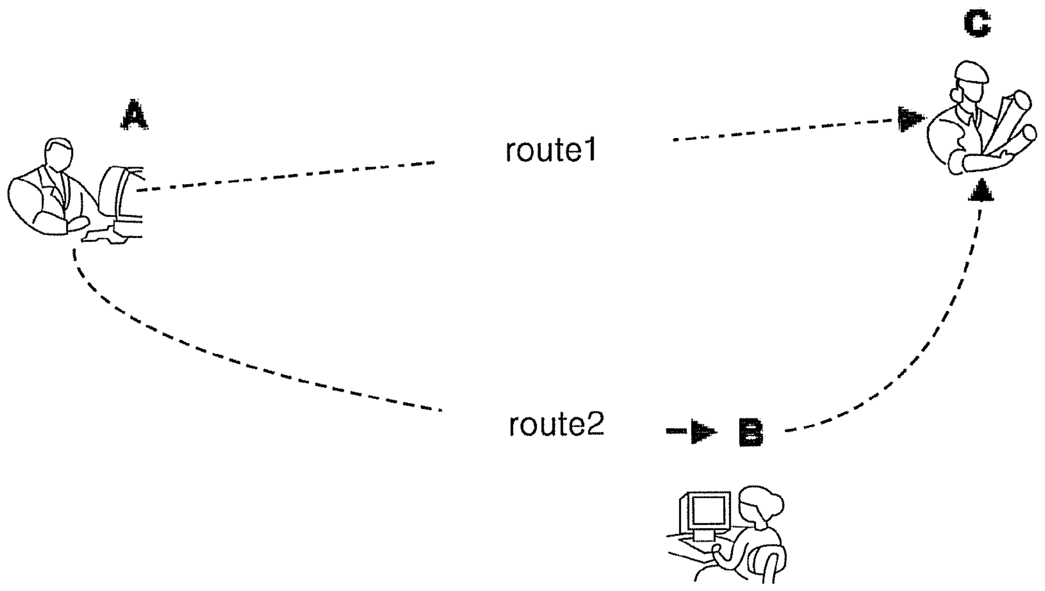
FIG. 10 is a diagram illustration a plurality of routes which may exist between users who try to establish correspondence relationship on the on-line human network.

FIG. 10 is a diagram illustration a plurality of routes which may exist between users who try to establish correspondence relationship on the on-line human network. When user A tries to establish correspondence relationship with user C which has no direct relationship with oneself, user A may directly transmit an invitation to user C (route 1), but can occasionally transmit an introduction request for receiving the introduction of user C via user B between which and oneself correspondence relationship has been already established. This case is on the assumption that correspondence relationship has been established between user B and user C, and correspondence relationship has been established between user A and user B. when considering the situation of real life, possibility that establishment of the correspondence relationship between user A and user C is successful is higher in the case in which invitation is performed via user B which has been acquainted with user B other than the case in which user A transmits an invitation message to user C which is not acquainted with user A. Although not shown in FIG. 9, user A may further have the other routes (for example, a route through user D—user E—user C) which do not pass through user B. In the case in which such a plurality of routes exist, which route is selected is the matter.

The present invention is characterized to define relationship indexes representing the familiarity and reliability between users and to utilize them in order to perform relative quantitative evaluation for a plurality of routes existing on the on-line human network, compare the results and select an optimal route. For this purpose, the present invention defines the concept of a required cost for each route as described below.

First, the relationship indexes can be defined as described below. For example, the case in which correspondence relationship has been not established previously like user A and user C is defined as the relationship rating of 0. If the relationship rating of 10 is assigned between user A and user B between which familiarity and reliability are relatively high and the relationship rating of 7 is assigned between user B and user C between which familiarity is relatively low, weights which are in inverse proportion to respective the relationship ratings thereof are assigned to links on the on-line human network corresponding to related relationship.

Figure 11:
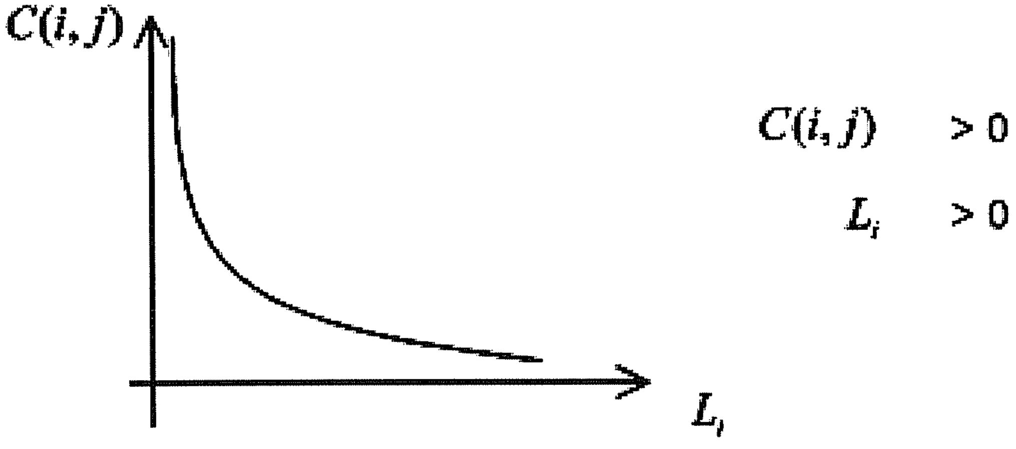
FIGS. 11 and 12 illustrate functional relation defined between relationship indexes R and related link weights (required cost)

In this case, a weight can be defined in various manners, but be obtained according to the function relationship illustrated in FIG. 11. It is assumed that a weight C(i,j) to be assigned to a link corresponding to a related relationship is in inverse proportion to the relationship index, when the relationship index between user i and user j is Rij. That is, it means that as the familiarity between users which are in correspondence relationship is higher, the weight of a related link is lower.

When weights are assigned to respective links on the on-line human network depending on the relationship indexes corresponding thereto, a cost required for a specific route can be defined as the sum of weights in the simplest example. For example, in FIG. 10, the relationship index between user A and user B is set to 10 and the index corresponds to the weight of 1 as following the function relationship defined with the same method as FIG. 11, the relationship index between user B and user C is set to 7 and the index corresponds to the weight of 30, and the relationship index between user A and user C which do not entirely know each other is set to 0 and the index corresponds to the weight of 100, in the case of FIG. 10, route cost is 100 when route 1 is selected, and route cost is 31 when route 2 is selected. Therefore, quantitative relative comparison for respective routes is caused to be possible by the relationship indexes and calculation of route cost, so that user A can select a route most suitable to oneself.

Furthermore, if needed, a predetermined reserve fund is assigned to each user's account and recorded in the user DB. When a user selects any one of the above-described routes, application, such as the case in which cost required for the route is subtracted from the account of the user and then the account is updated, is possible. In this case, the reserve fund can be differently assigned depending on users, and increase according to the activity or purchasing of user on the network.

That is, a user which selects an optimal route having lowest required cost can obtain benefit in which cost, to be subtracted from user's own account, is reduced. The account can have the form of a general cyber-money assigned to the user subscribing to a predetermined Internet service. In the above example, when user B which delivers the invitation message to user C accepts introduction and correspondence relationship with user A is established, user B may be paid some of route cost which user A must pay as an incentive.

Figure 12:
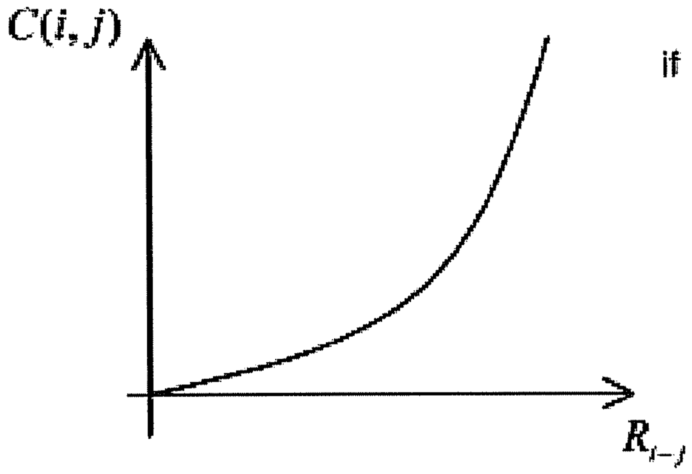

The above-described method of calculating route cost can be modified in various manners. For example, as in the function relationship illustrated in FIG. 12, user i inputs a relationship index which is desired to be set between oneself and user j and required costs may differ depending on the sizes of thereof. In the example illustrated in FIG. 12, as user i desires a higher relationship index, that is, higher reliability, the cost which must be paid further increases. A method or calculation formula for calculating route cost can be modified in various manners, so that a method to be described below must be understood to be an example.

Figure 13:
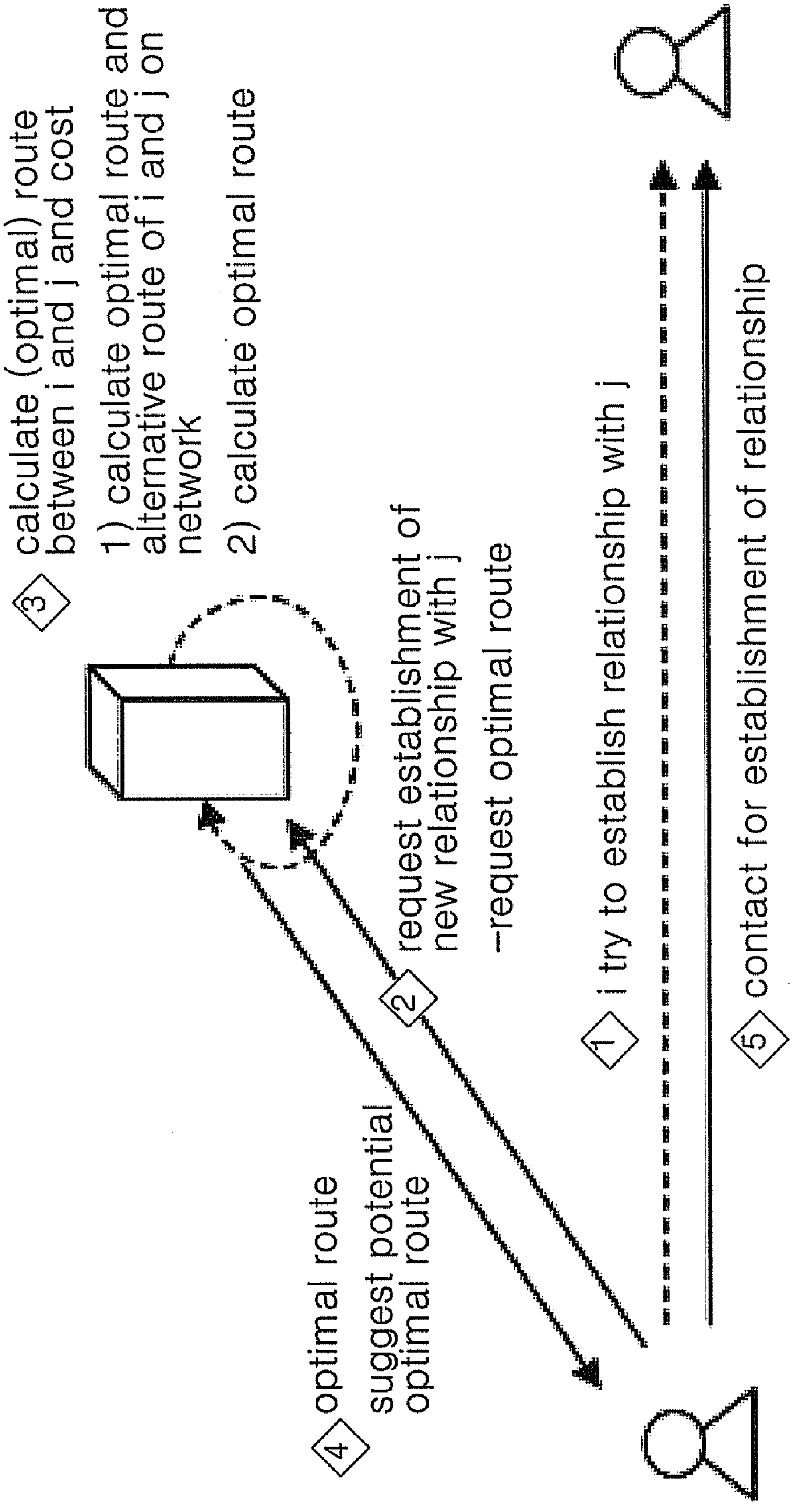
FIG. 13 is a diagram schematically illustrating the process of the present invention which finds an optimal route based on calculated route costs and suggests it to a user as described above.

FIG. 13 is a diagram schematically illustrating the process of the present invention which finds an optimal route based on calculated route costs and suggests it to a user as described above. First, user i links to a search server, requests new relationship establishment with user j, and then requests searching an optimal route. In response to it, the search server performs a static route search step of searching for one or more actual routes existing between user i and user j on a human network, performing evaluation for the one or more optimal routes based on the relationship indexes R which are reflected to respective links on the actual route, and providing the result, and, furthermore, performs a dynamic route search step of searching for one or more virtual routes which can potentially exist between user i and user j on the human network, performing evaluation for the one or more potential routes based on the relationship indexes R which are reflected to respective links on the potential route, and providing the result.

In this case, the search server compares the result value (for example, required cost or the like) for potential optimal routes which are searched for and evaluated at the dynamic route search step with the result value for optimal routes which are searched for and evaluated at the static route search step and selectively suggests them to user i based on the comparison result. In this case, user j is the user designated by user i or the user searched for by the search server when user I inputs a certain condition (for example, patent attorney resident in Seoul, within a range of relationship index 4). Furthermore, the virtual route refers to a route composed of one or more actual routes on which links has been established between nodes and one or more reserved routes which links are not established yet.

Figure 14:
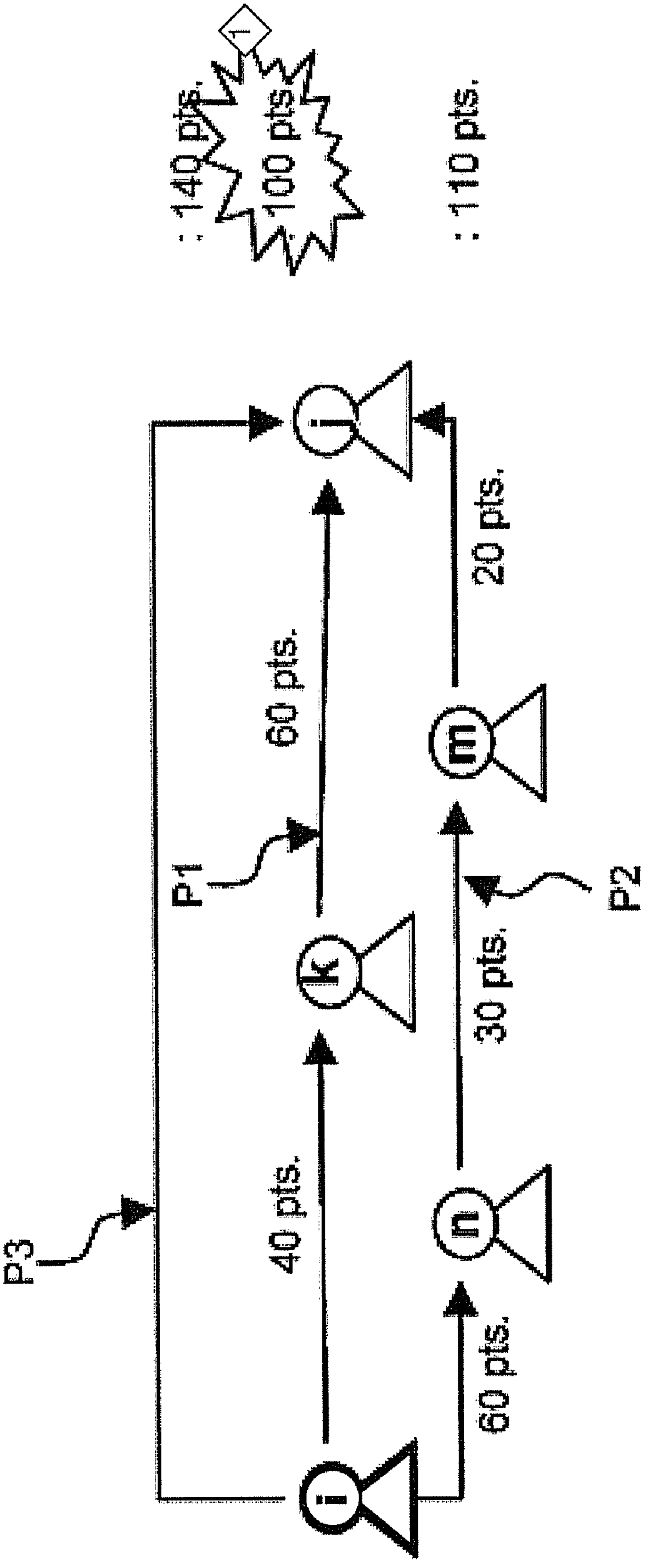
FIGS. 14 and 15 are diagrams illustrating the results of static route search and evaluation performed by a search server for predetermined users when only actual routes exist on the on-line human network.
Figure 15:
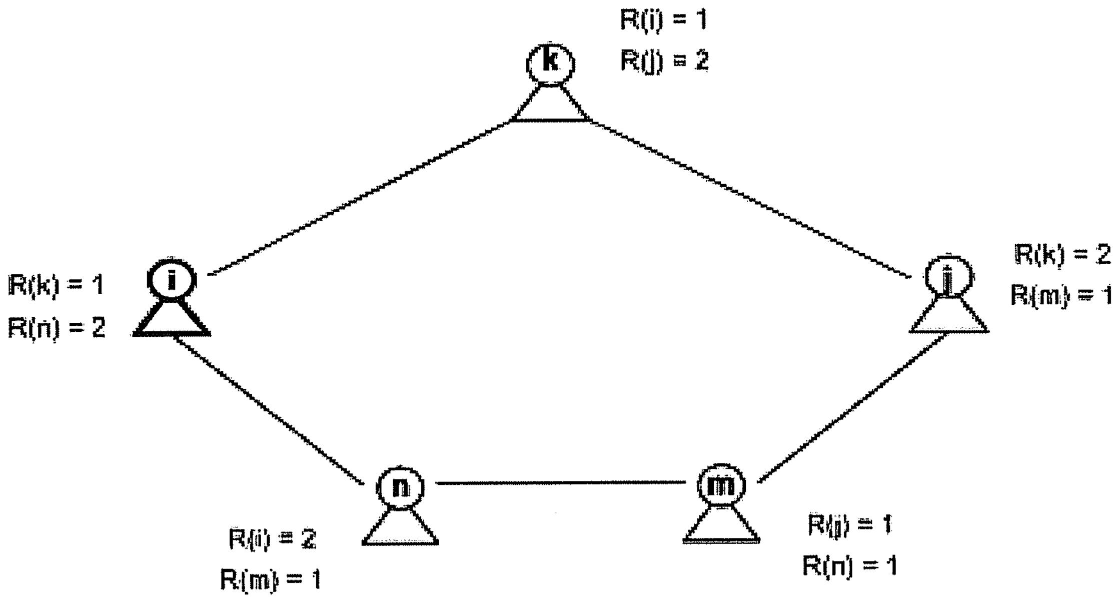

FIGS. 14 and 15 illustrate the results of static route search and evaluation performed by a search server for predetermined users when only actual routes exist on the on-line human network.

On the assumption that, as illustrated in FIGS. 14 and 15, on the on-line human network, there are for example, users k and n which are related with user i, users k and m which have correspondence relationship with user j, and users n and m which have correspondence relationship with each other on a middle node, the search server, in response to the request of user i, searches for all actual routes existing between user I and user j, that is, static routes (i→k→j, i→n→m→j, i→j), calculates costs required for the respective routes according to the relationship indexes R for respective links existing on the searched accrual routes and suggests one or more optimal routes (i→k→j) including the lowest route cost to user i, thereby enabling a user to select the optimal route.

That is, assuming that correspondence relationship, as illustrated in FIG. 14 with respect to user i, j, k, m, and n registered are the user DB, is defined in the relationship information DB, relationship indexes are defined as illustrated for the correspondence relationship (for example, the relationship index between user n and user m is 1, the relationship index between user i and user k is 1, the relationship index between user k and user j is 2, and the relationship index between user m and user j is 1). In this case, when user i requests the search server to search for a route for the establishment of correspondence relationship with user j, the search server assigns weights (for example, the weight between user i and user k is 40 points, the weight between user k and user j is 60 points, the weight between user i and user n is 60 points, the weight between user n and user m is 30 points, and the weight between user m and user j is 20 points) for respective links according to the relationship indexes as illustrated in FIG. 15.

Furthermore, according to a method of calculating route cost by summing the weights of respective routes, in the case (P3) in which a direct correspondence relationship is requested, the cost of 140 points is defined, in the case (P2) of passing through user k, a required cost is 100 points, and in the case (P1) of passing through user n and user m, a route cost is 110 points, so that, in this case, the lowest route cost is the route through user k.

Figure 16:
FIGS. 16 to 18 are diagrams illustrating the results of static route search and dynamic route search and evaluation performed by a search server for predetermined users in the case in which potential virtues routes exist on the on-line human network.
Figure 17:
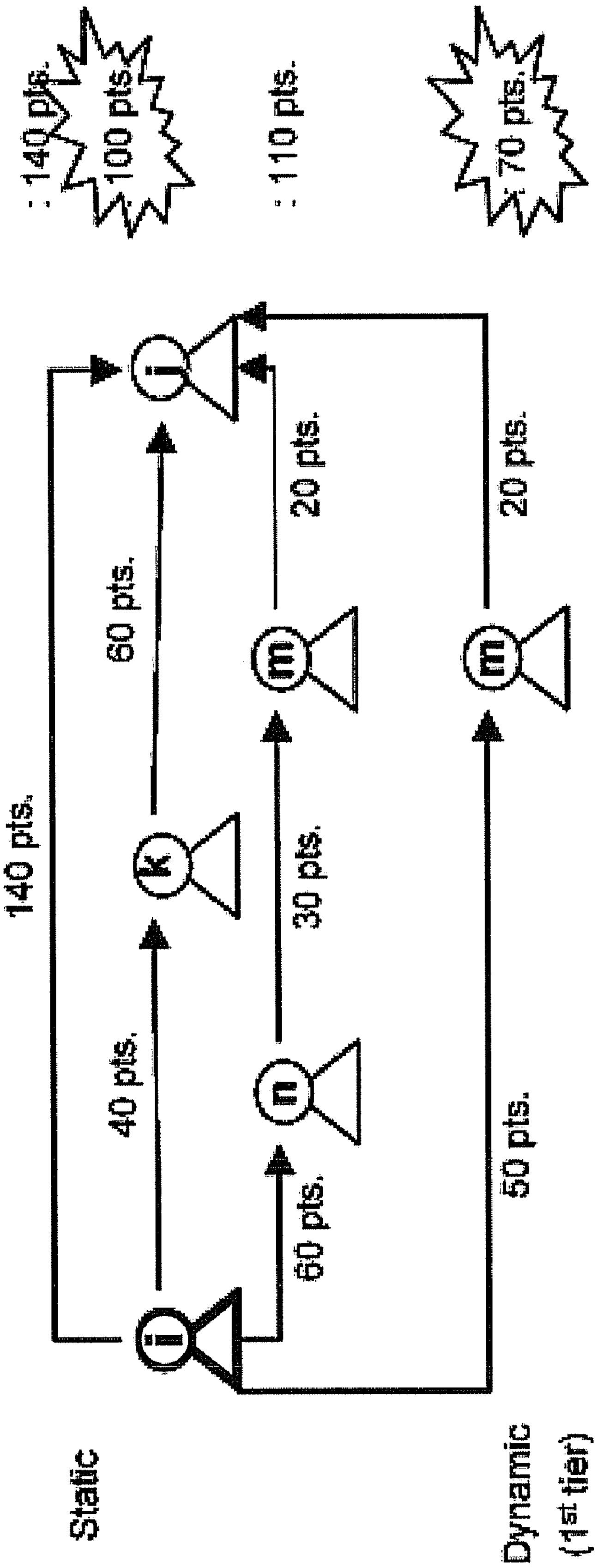
Figure 18:
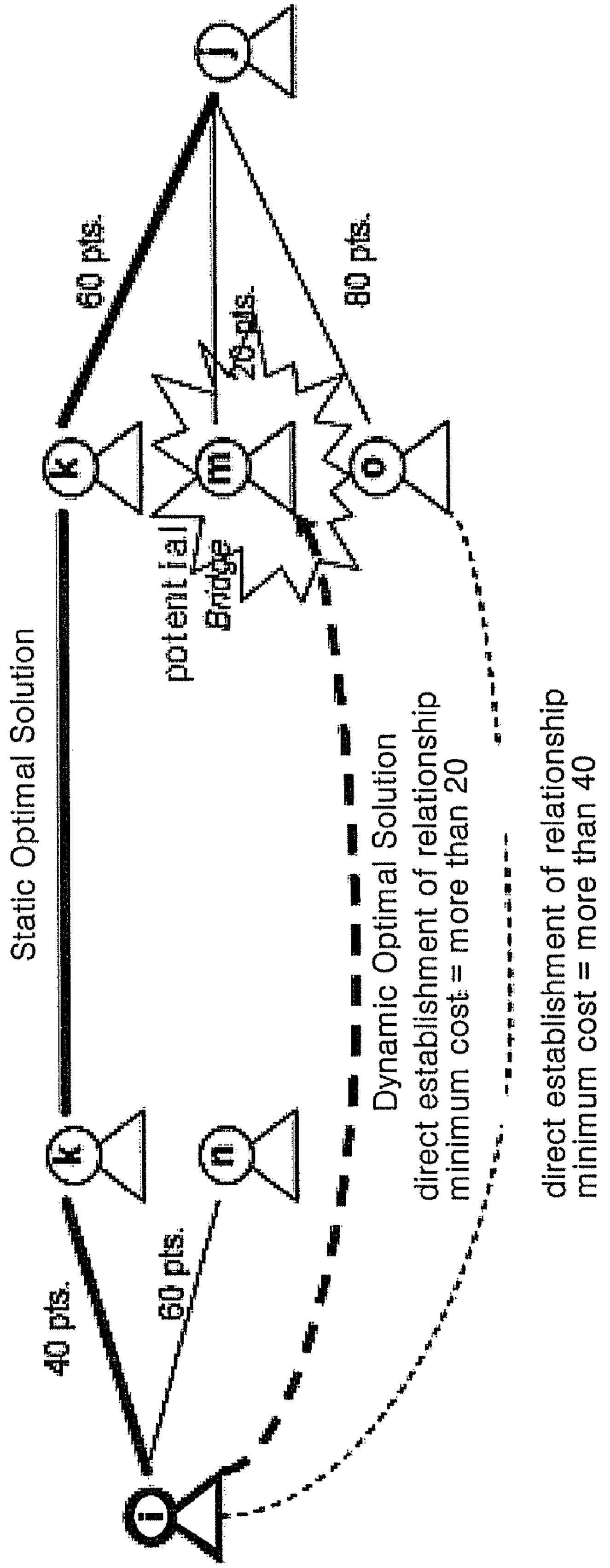

FIGS. 16 to 18 illustrate the results of static route search and dynamic route search and evaluation performed by a search server for predetermined users in the case in which potential virtues routes exist on the on-line human network.

On the assumption that, as illustrated in FIG. 16, on the on-line human network, there are for example, users k and n which have correspondence relationship with user i based on required costs, 40 pts and 60 pts respectively, users k, m and o which have correspondence relationship with user j based on required costs, 60 pts, 20 pts and 80 pts respectively, and users n and m which have correspondence relationship with each other based on a required cost 30 pts, the search server, in response to the request of user i, searches for all actual routes existing between user i and user j, that is, static routes (i→k→j, i→n→m→j, i→j), and calculates static route costs (Ci,k,j), (Ci,n,m,j) and (Ci,j) according to the relationship indexes R for respective links existing on the found accrual routes. In this case, the required costs for respective routes calculated by the search server are Ci,k,j=100 pts, Ci,n,m,j=110 pts and Ci,j=140 pts, as illustrated in FIG. 17, so that one or more static routes including the route for which the lowest cost 100 pts of them is required is suggested to the user i, thereby enabling the user i to select the optimal route.

Thereafter, the search server searches for virtual routes potentially existing between user i and user j, that is, dynamic routes (i→m→j and i→o→j) illustrated in FIG. 18, and calculates dynamic route costs (Ci,m,j) and (Ci,o,j) according to the relationship indexes R for respective links on the found virtual routes. However, the relationship indexes between user i and user m and user i and user o are not set yet, and related routes are virtual routes on which links are not established, so that required costs can not be calculated. Therefore, the search server calculates the lowest costs (Ci,m) and (Ci,o) on the assumption that user i directly establishes correspondence relationship with user m and user o. That is, the search server can determines total required cost for respective dynamic routes using the summation of the required costs (Cm,j) and (Co,j), that is, 20 pts and 80 pts, for route between user m and j and route between user o and user j which are actual routes, in which relationship indexes has been set and links have been established, with the lowest costs (Ci,m) and (Ci,o) conditionally calculated.

Therefore, in the search server, a cost (Ci,m,j) required for the dynamic route (i→m→j) passing through user m is calculated to be the summation, that is, (Ci,m,j)=(Ci,m)+20 pts, of the required cost (Ci,m) between user i and user m, and the required cost (Cm,j), that is, 20 pts between user m and user j.

A cost (Ci,o,j) required for the dynamic route (i→o→j) passing through used o is calculated to be the summation, that is, (Ci,o,j)=(Ci,o)+80 pts, of the required cost (Ci,o) between user i and user o, and the required cost (Co,j), that is, 20 pts between user o and user j.

As a result, the search server, as illustrated in FIG. 18, sets the optimal dynamic route to the case passing through user m among one or more dynamic routes (i→m→j or i→o→j) which respectively pass through user m an user o, compares the required cost (Ci,m,j) for the optimal dynamic route with the required cost (Ci,j,k) for one or more optimal static routes (i→k→j) searched from the actual routes, and selectively suggests the optimal dynamic route (i→m→j) to user i when the cost in which the optimal dynamic route is used is more efficient (Ci,j,k>Ci,m,j) based on the comparison result, thereby enabling the user i to select the optimal dynamic route.

In this case, the search server can provide a message guiding acquaintance relationship to be effectively established using the dynamic optimal route along with content about substantial efficiency improvement for the establishment of new acquaintance relationships. The search server additionally provides a message including message content, such as, "please, have a relationship with user m, and it is more efficient to have the establishment with user j through user m than to have the establishment with user j through user k".

Thereafter, user i makes contact (for example, request the delivery of an introduction message to another user on a route) for the establishment of correspondence relationship with user j through the optimal dynamic route suggested as illustrated above.

In this case, the optimal dynamic route which can potentially exist refers to the route through a user, which may be more efficient in order to implement the establishment of correspondence relationship with user j, when correspondence relationship is established with any one of the other users which have no relationship with user i yet as illustrated in FIGS. 16 to 18. That is, this means that the case in which a relationship with user m is newly established to approach user j results in the reduction of cost when the cost of an optimal route is relatively high based on the correspondence relationship between users which are previously set and are recoded in the relationship information DB. For example, when user m of which relationship index with user j is very high exists, user i first establishes acquaintance relationship with user m and, thereafter, introduces myself to user j via user m even if user m currently has no correspondence relationship with user i, thereby reducing route cost which frequently occurs in real life.

Figure 19:
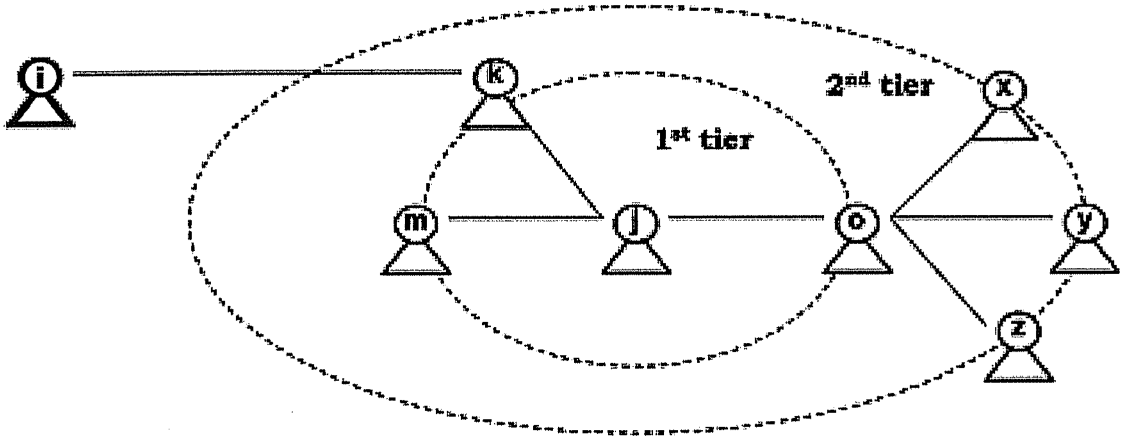
FIG. 19 is a diagram illustrating correspondence relationship for a plurality of users existing between user i and user j.

FIG. 19 illustrates correspondence relationship for a plurality of users existing between user i and user j. When the search server searches for one or more virtual routes potentially existing between user i and user j as illustrated in FIGS. 16 and 18, the search server searches for one or more virtual routes with respect to user j selected by user i, for nodes k, m and o existing in the first relationship layer of user j, thereby reducing the load of a system which may be generated upon the search of node.

However, such a search operation is not limited to the nodes, k, m and o existing in the first relationship layer of user j and, it is apparent that, if necessary, the search operation can be performed for nodes x, y and z existing in the second relationship layer of user j or higher relationship layers as illustrated in drawings. It is apparent that when the user i establishes a relationship with user m, which is a potential bridge, using the principle, another user existing on the relationship layers higher than the first relationship layer of user m may be the bridge between user i and user m.

Figure 20:
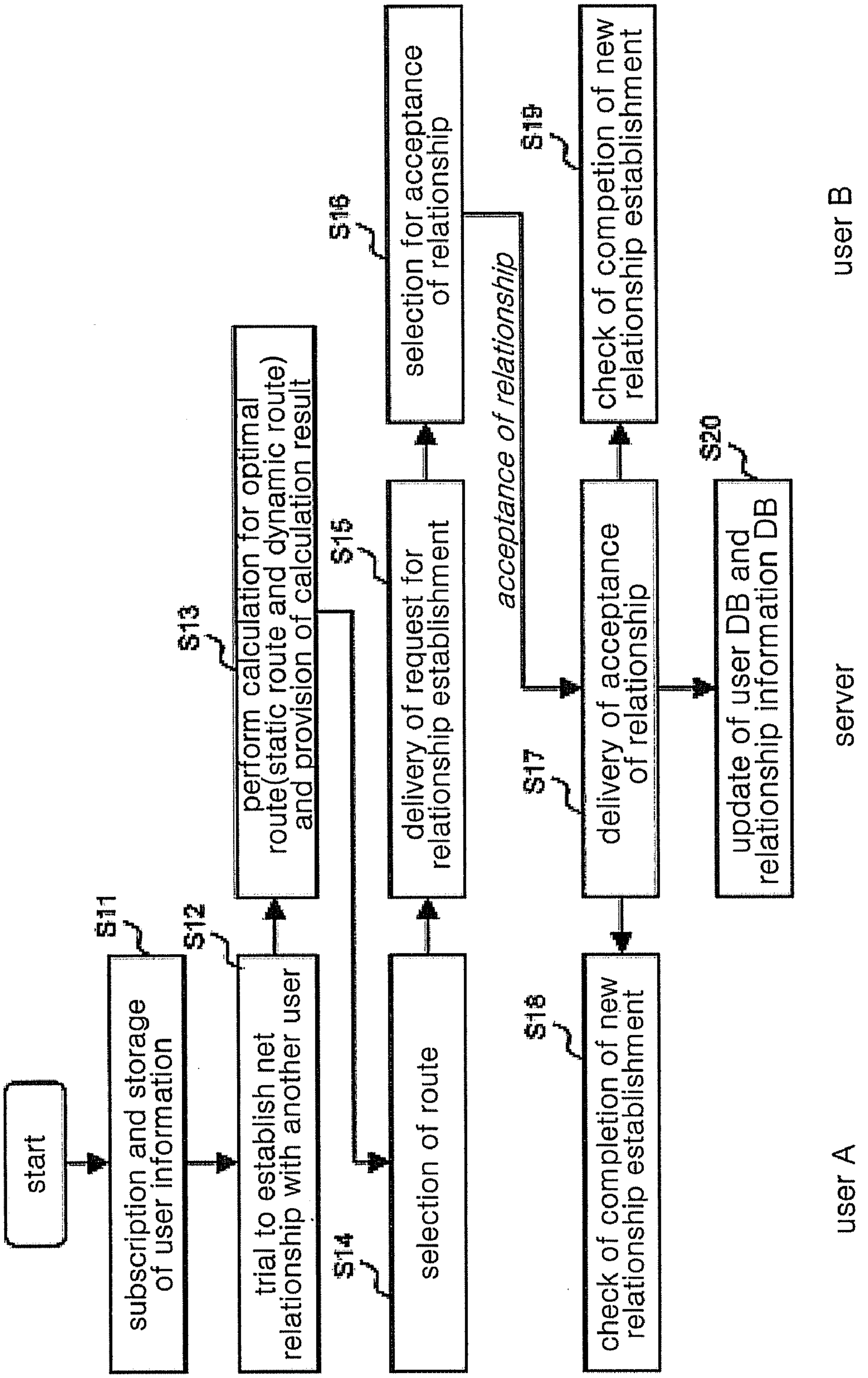
FIG. 20 is a diagram illustrating the flowchart of an embodiment of the human network management method of the present invention.

FIG. 20 illustrates the flowchart of an embodiment of the human network management method of the present invention. The subscription of users is performed and user information is stored in the user DB at step S11. When the subscribed user requests the establishment of a new relationship with another user of the search server at step S12, the search server performs calculation for an optimal route of static routes and dynamic routes and provides the result thereof at step S13. The user selects any one of suggested routes at step S14. When users on the way of the route deliver the request for the establishment of relationship to a user to be targeted at step S15, the user to be targeted selects whether to accept the relationship at step S16. The search server delivers the acceptance result for the relationship to both users at steps S18 and S19, updating is performed on the account stored in the user DB and the relationship information DB and new correspondence relationship are recorded in the user DB and the relationship information DB at step S20.

Figure 21:
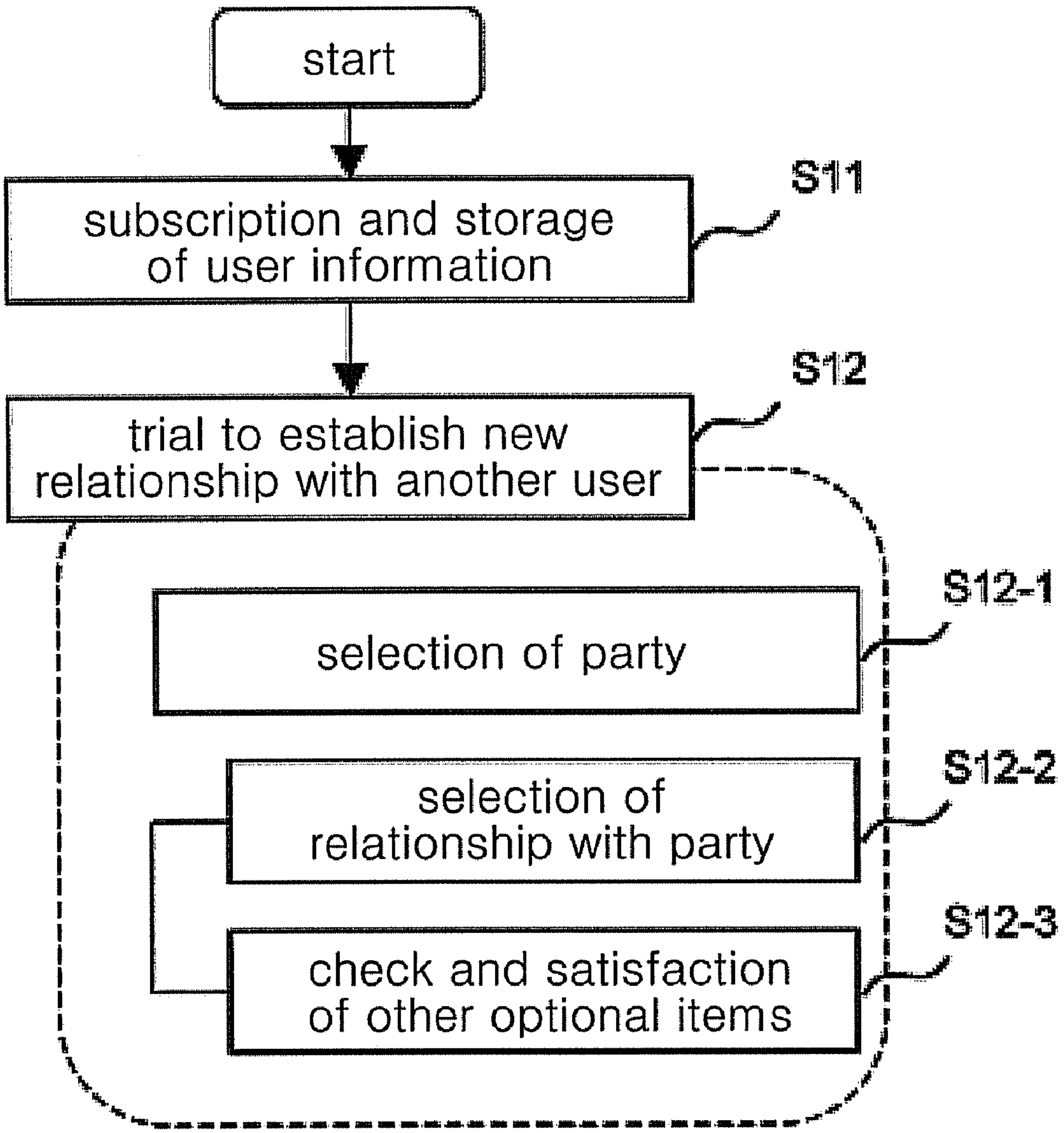
FIG. 21 is a diagram illustrating pieces of information, input by a user, in order to transmit a request for the establishment of relationship with another user.

FIG. 21 illustrates pieces of information, input by a user, in order to transmit a request for the establishment of relationship with another user. First, a party is selected at step S12-1, the degree (relationship index) of relationship desired to be set with respect to the party is selected at step S12-2, and the remaining required details are input at step S12-3. In this case, the party may be a person which registers a specific script to the bulletin board of a community or a club to which the user subscribes, the simultaneous recipient/user receiving a carbon copy of information/content provided to user A, or a user which is known at a communication step with another user.

The degree of relationship is differently set through gradation of relationships desired to be established with a corresponding user, and, therefore, the range of information opening. As other required items, an incentive to be paid upon establishment of relationships is proposed to user A, or a user can input its own personal information. Furthermore, for example, the upper limit of a route cost (below XX point), the limitation to the degree of kinship (for example, below 5 degree of kinship), whether to provide a potential optimal route, or limitation to the number thereof may be options at the time of searching for routes by a server.

Figure 22:
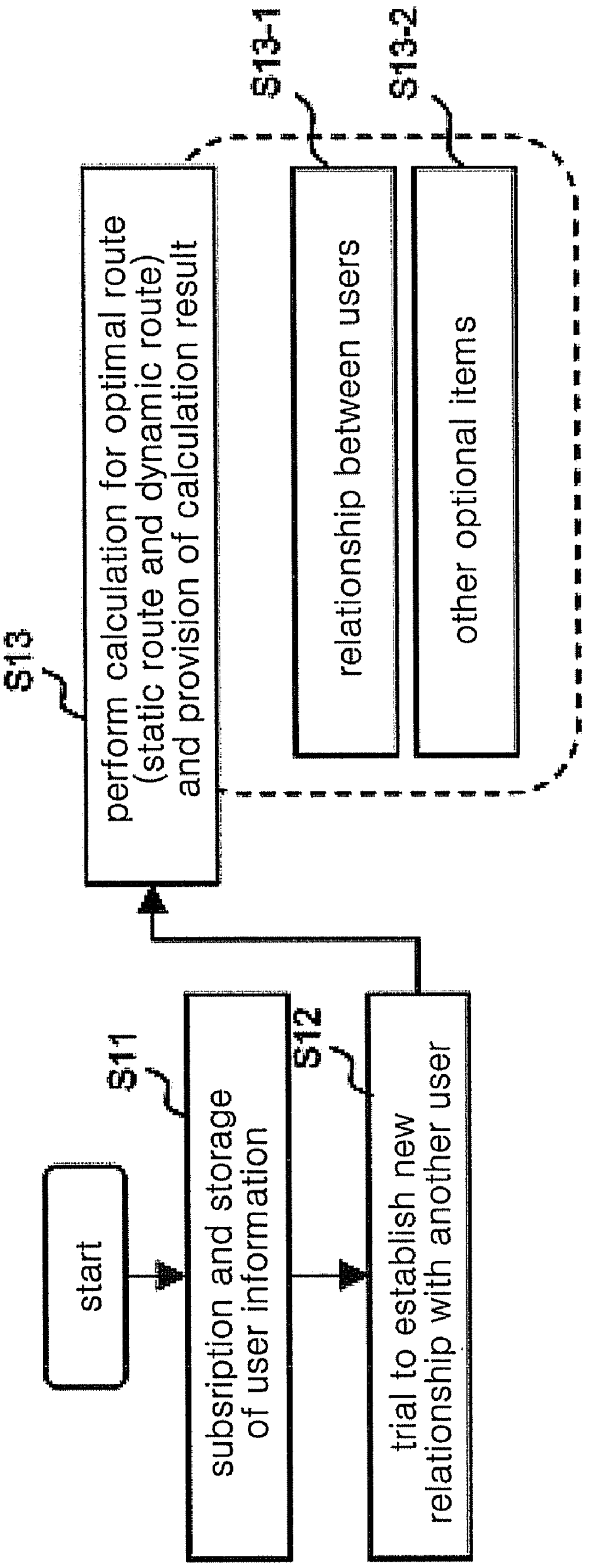
FIG. 22 is a diagram illustrating items which is reflected to the search of an optimal route by the search server.

FIG. 22 is a diagram illustrating items which is reflected to the search of an optimal route by the search server. As described above, the degree (relationship index) of relationship between users is considered at step S13-1. As another option item, an application is possible in that the remaining account of the user requesting searching is checked with reference to the user DB and, based on this, the founded routes are suggested to the user only when the cost therefor is lower than the balance in the account, or a message indicating the lack of reserve fund is transmitted to the user at step S13-2.

Figure 23:
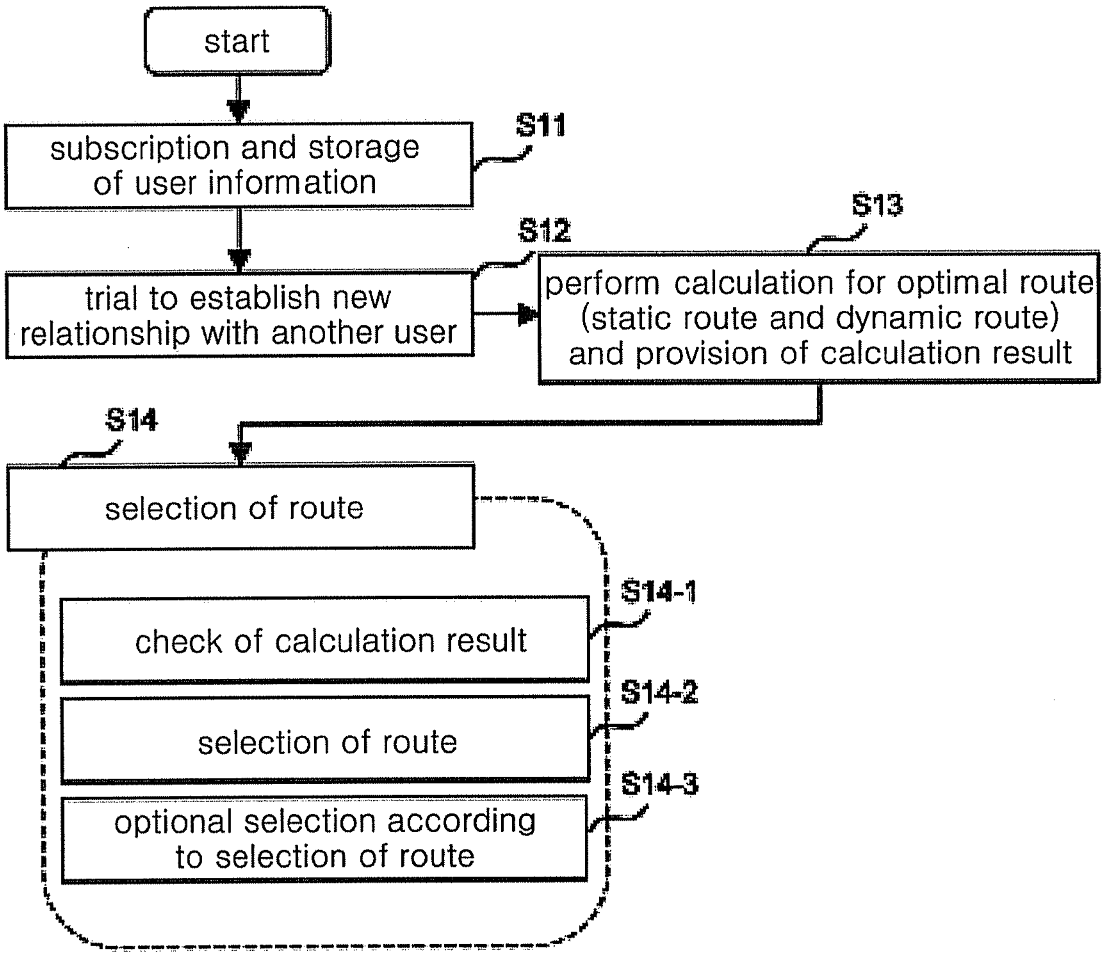
FIG. 23 illustrates elements generally considered at step S114 in which a user selects a route.

FIG. 23 illustrates elements generally considered at step S14 in which a user selects a route. First, the user checks the result of calculation for provided route cost at step S14-1, selects a route of suggested routes at step S14-2 and selects option items according to the selected route at step S14-3. In this case, the option items may be request expressions, request details, or incentives according to requests.

Figure 24:
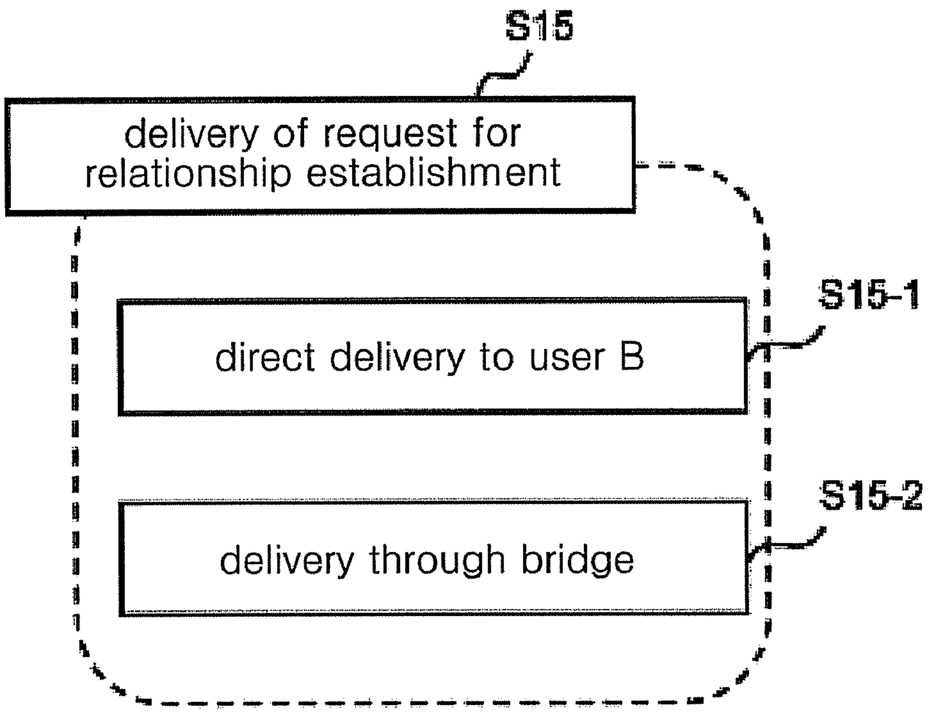
FIG. 24 illustrates items to be considered at a step of delivering a message requesting the establishment of relationship which is performed by the search server.

FIG. 24 illustrates items to be considered at a step of delivering a message requesting the establishment of relationship which is performed by the search server. Based on the route selection of user A, the message may be directly delivered to user B at step S15-1, and may be delivered through another user (bridge) at step S15-2. In this case in which delivery is performed through another user at step S15-2, whether another user accepts a role of introduction is inquired, and, if accepts, introduction of user A to user B or a recommendation item is added to a new message which may be transmitted. In this case, a predetermined incentive may be provided to user B, and the incentive may be subtracted from the account of user A or user B as part of a route cost.

Figure 25:
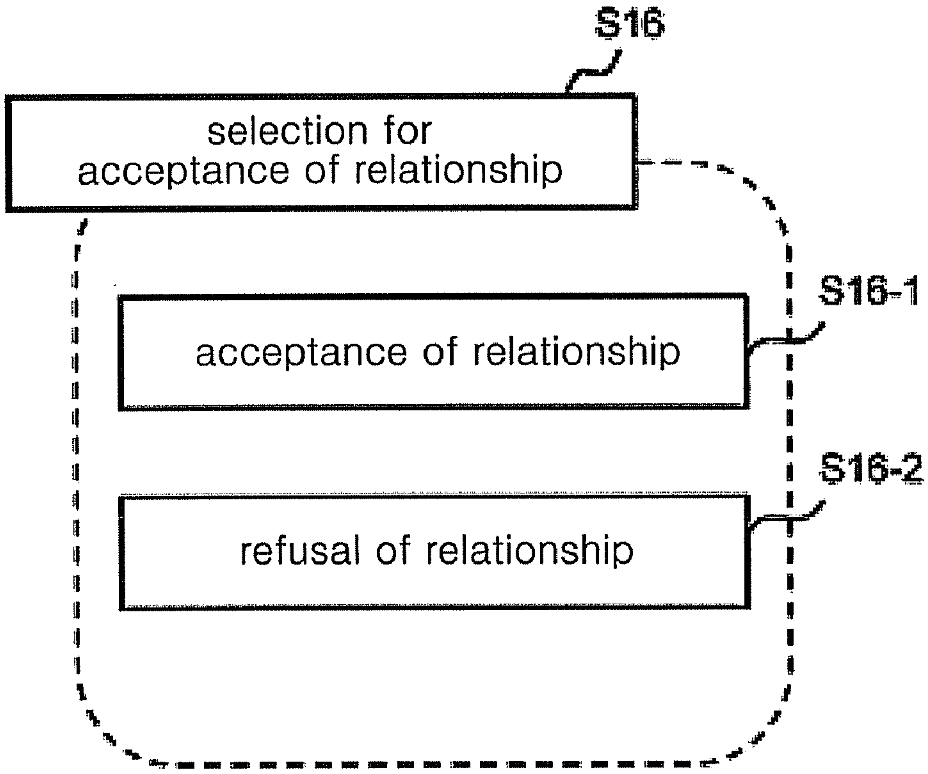
FIG. 25 illustrating items to be considered by user B in order to select whether to accept a relationship for the delivered message requesting the relationship.

FIG. 25 illustrating items to be considered by user B in order to select whether to accept a relationship for the delivered message requesting the relationship. User B accepts or refuses the relationship at step S16-1 or S16-2. The refusal of the relationship by user B can be processed in various levels. User B is provided with various selections, such as complete refusal and then the interception of relationship requests, the refusal of only a current relationship, conditional refusal (user B inputs an additional request item such as the adjustment of a relationship index for user A), the reservation of acceptance determination and ignoring a relationship request message, and, therefore, the server can temporarily store or delete a corresponding relationship request message.

Figure 26:
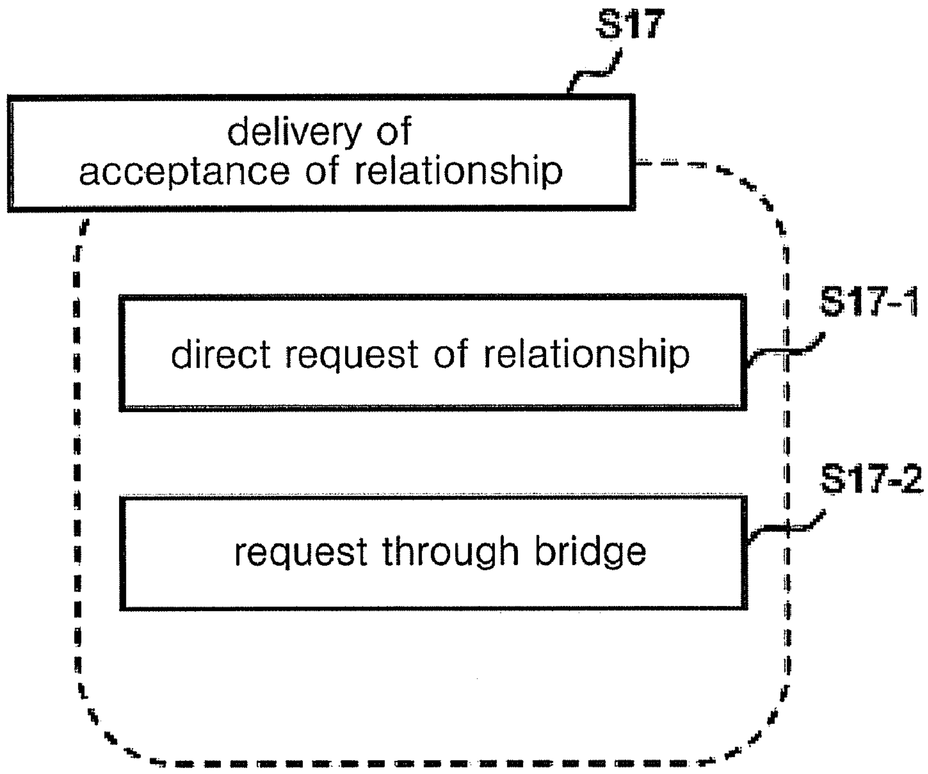
FIG. 26 illustrates a step for delivering a relationship acceptance message which is performed by the server.

FIG. 26 illustrates a step for delivering a relationship acceptance message which is performed by the server. When there is a direct relationship request at step S17-1, user A and user B are notified of it, thereby the establishment of the new relationship being known, and are notified of the range of mutual information opening or subtraction of reserve fund due to a route cost. In the case of the establishment of relationship through another user at S17-2, another user and related users are notified of the fact of relationship establishment and the settlement of the balance based on the route cost is performed to notify the result.

Figure 27:
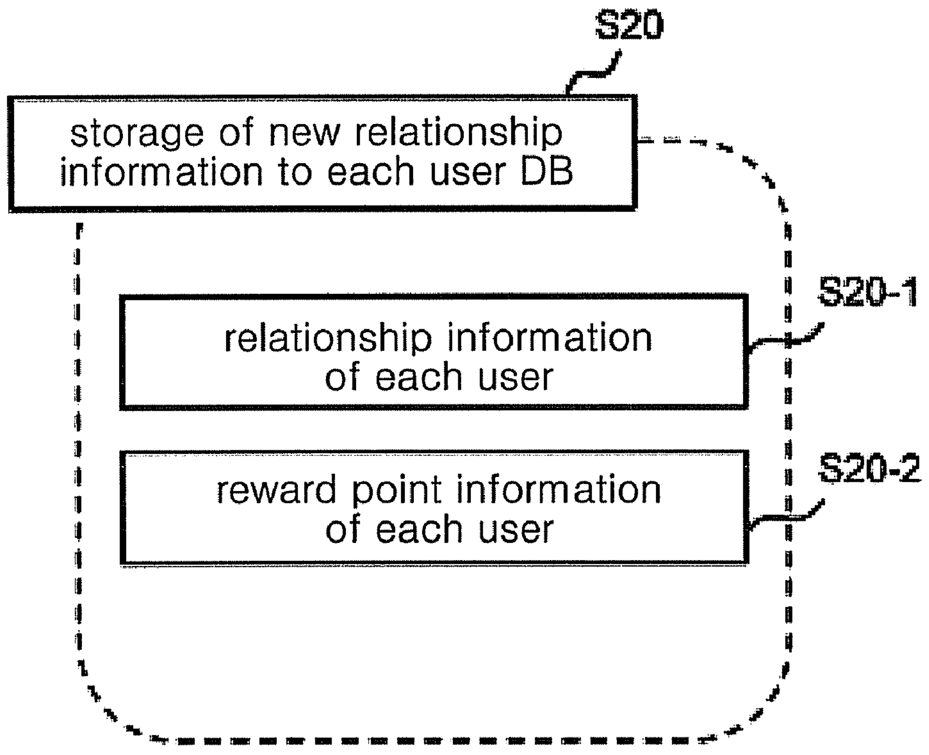
FIG. 27 illustrates items to be considered at a step of updating DB which is performed by the server.

FIG. 27 illustrates items to be considered at a step of updating DB which is performed by the server. The server subtracts and updates account recoded in the user DB according to a settled breakdown at step S20-2, and records the establishment of a new correspondence relationship in the relationship information DB at step S20-1.

FIG. 28 illustrates the construction of an embodiment of the online human network management system 100 of the present invention and the data processing process thereof. A search server 20 builds and manages a user DB 12 and a relationship information DB 14 within a database 10. The user DB 12 can store the ID, personal information and assigned reserve fund of each user. Furthermore, the relationship information DB 14 can store the correspondence relationship (or acquaintance relationship) between respective users, the relationship indexes between respective two users, the information exchange between respective two users or relationship activity values representing the number of data transmission and reception.

The search server 20 basically functions to search for another user, which satisfies a predetermined condition, on the on-line human network, provide the result to a user requesting searching, and additionally calculates respective route cost in which the above-described relationship indexes are reflected, thereby enabling relative comparison for respective routes. User A which wants to establish a new relationship with user C can select an optimal route based on the route cost provided by the search server 20, and can transmit a message requesting the establishment of a relationship directly or through another user (bridge, user B in the illustrated drawing). When user B which is on the middle of the route, accepts a role for introduction, the message requesting the establishment of a relationship is delivered to user C.

When user C accepts the establishment of a relationship, the search server 20 updates information about the account of the user and correspondence relationship, thereby updating the user DB 12 and the relationship information DB 14.

In the online human network management system 100, a user terminal may be any one of various fixed or mobile terminals, such as a laptop, a desktop, a PDA and a PCS.

Some or all of the technical spirit of the present invention can be implemented in various forms using hardware, software or recoding medium storing them. Although the present invention have been disclosed with reference to the preferred embodiments above, the present invention 10 is not limited to the above-described specific embodiments and those skilled in the art can modify them without departing from the substance of the present invention as disclosed in the accompanying claims. The modifications are within the scope as disclosed in the accompanying claims.

According to the present invention, a specific technology means, which searches for information required for establishment of new relationship from previously established correspondence relationship and provides it in order to set new acquaintance relationship, and, if 20 required, searches for information required for establishment of new relationship on a potential route on which correspondence relationship has been not established yet, thereby promoting not only users having relationship with many users but also users having correspondence relationship with a few user to stably and efficiently build an on-line human network, is secured, and the patterns of acquaintance relationships can be diverse on line.

While the invention has been described with reference to the exemplary embodiments, it can be understood by those skilled in the art that the invention can be variously modified and altered without departing from the spirit and scope of the invention described in the attached claims.

The terminology used in the description of the invention herein is for the purpose of describing particular embodiments only and is not intended to be limiting of the invention. As used in the description of the embodiments of the invention and the appended claims, the singular forms "a", "an" and "the" are intended to include the plural forms as well, unless the context clearly indicates otherwise.

Unless otherwise defined, all technical and scientific terms used herein have the same meaning as commonly understood by one of ordinary skill in the art to which this invention belongs. All publications, patent applications, patents, and other references mentioned herein are incorporated by reference in their entirety.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that relative terms are intended to encompass different orientations of the device in addition to the orientation depicted in the Figures.

Moreover, it will be understood that although the terms first and second are used herein to describe various features, elements, regions, layers and/or sections, these features, elements, regions, layers and/or sections should not be limited by these terms. These terms are only used to distinguish one feature, element, region, layer or section from another feature, element, region, layer or section. Thus, a first feature, element, region, layer or section discussed below could be termed a second feature, element, region, layer or section, and similarly, a second without departing from the teachings of the present invention.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Further, as used herein the term "plurality" refers to at least two elements. Additionally, like numbers refer to like elements throughout.

Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more."

What is claimed is:

1. A method that utilizes a processor to connect users in a network, the method comprising:

maintaining a first database, the first database containing profiles of a plurality of users in a network;

maintaining a second database, the second database containing a relationship index between some of the users wherein the relationship index is determined based, at least in part, upon a degree of a correspondence relationship between two users, the degree of the correspondence relationship having been set by at least one of the two users;

forming a social network, the network comprising a plurality of nodes and a plurality of links between at least some of the nodes, in association with the relationship index stored in the second database, wherein at least some of the nodes are the users and each of the links is a virtual connection path between two users who have the correspondence relationship;

upon receipt of a request from a first user, searching, using the processor, for at least one route connecting the first user to a second user in the social network based, at least in part, upon said existing links and the relationship index of the links; and evaluating each of the searched routes based, at least in part, upon the relationship indexes of the links which form said respective searched routes, wherein evaluating comprises calculating cost of the searched routes in accordance with total weights of the links which form each route and upon selection of a route among the evaluated routes by the first user, charging the cost of the selected route to the first user's account, wherein the weight is inversely proportional to the relationship index of the respective link between two nodes having the correspondence relationship, and wherein the cost of the selected route comprises an amount paid to a third user when the first user sends an invitation message for a new relationship to the second user via a third user having correspondence relationships with both the first user and the second user.

2. The method of claim 1, wherein the route is a virtual route which comprises:

at least one link which was previously created between two nodes due to the correspondence relationship of the respective two nodes; and at least one link which has not been created between two nodes.

3. The method of claim 1, wherein the route is an existing route which consists of a plurality of links which were previously created between two nodes due to the correspondence relationship of the respective two nodes.

4. The method of claim 1, wherein at least one of the routes is a virtual route which comprises at least one link which was previously created between two nodes due to the correspondence relationship of the respective two nodes; and at least one link which has not been created between two nodes, and at least one of the routes is an existing route which consists of a plurality of links which were previously created between two nodes due to the correspondence relationship of the respective two nodes, and further comprising:

comparing the evaluation result of each virtual route with the evaluation result of each existing route; and providing the first user with the result of the comparison.

5. The method of claim 1, further comprising updating the relationship index contained in the second database in accordance with the number of online communications between the users having the correspondence relationship.

6. The method of claim 1, wherein the request includes at least one condition for the second user and the second user is selected based, at least in part, upon the condition.

7. The method of claim 1, wherein the request includes at least one condition for the second user and the second user is selected based upon the condition and the evaluation result.

8. The method of claim 1, further comprising allowing the first user to send an invitation message for a new relationship to the second user;

upon the second user's acceptance, storing the new correspondence relationship of the first user and the second user.

9. The method of claim 1, further comprising:

recommending the first user at least one route among the evaluated routes based, at least in part, upon the result of the evaluation.

10. The method of claim 9, further comprising:

allowing the first user to select one route among the recommended routes.

11. A method that utilizes a processor to connect users in a network, the method comprising:

maintaining a database, the database containing profiles of a plurality of users in a network and a relationship index between users in the network wherein the relationship index is determined based, at least in part, upon a degree of a correspondence relationship between two users, the degree of the correspondence relationship having been set by at least one of the two users;

storing existing links associated with the relationship index of the existing links which were previously created between two nodes due to the correspondence relationship of the respective two nodes, wherein the nodes are the users and each of the links is a virtual connection path between two users who have correspondence relationship;

upon receipt of a request from a first user, searching, using the processor, for at least one route connecting the first user to a second user based, at least in part, upon said existing links and the relationship indexes of the links; and evaluating each of the searched routes based, at least in part, upon the relationship indexes of the links which form said respective searched routes, wherein evaluating comprises calculating cost of the searched routes in accordance with total weights of the links which form each route and upon selection of a route among the evaluated routes by the first user, charging the cost of the selected route to the first user's account, wherein the weight is inversely proportional to the relationship index of the respective link between two nodes having the correspondence relationship, and wherein the cost of the selected route comprises an amount paid to a third user when the first user sends an invitation message for a new relationship to the second user via a third user having correspondence relationships with both the first user and the second user.

12. The method of claim 11, wherein the route is a virtual route which comprises:

at least one link which was previously created between two nodes due to the correspondence relationship of the respective two nodes; and at least one link which has not been created between two nodes.

13. The method of claim 11, wherein the route is an existing route which consists of a plurality of links which were previously created between two nodes due to the correspondence relationship of the respective two nodes.

14. The method of claim 11, further comprising recommending the first user at least one route among the evaluated routes based, at least in part, upon the result of the evaluation.

15. The method of claim 11, wherein at least one of the routes is a virtual route which comprises at least one link which was previously created between two nodes due to the correspondence relationship of the respective two nodes; and at least one link which has not been created between two nodes, and at least one of the routes is an existing route which consists of a plurality of links which were previously created between two nodes due to the correspondence relationship of the respective two nodes, and further comprising:

comparing the evaluation result of each virtual route with the evaluation result of each existing route; and providing the first user with the result of the comparison.

16. The method of claim 11, further comprising updating the relationship index contained in the second database in accordance with the number of online communications between the users having the correspondence relationship.

17. The method of claim 11, wherein the request includes at least one condition for the second user and the second user is selected based, at least in part, upon the condition.

18. The method of claim 11, further comprising allowing the first user to send an invitation message for a new relationship to the second user;

upon the second user's acceptance, storing the new correspondence relationship of the first user and the second user.

19. A social network management system comprising:

a non-transitory first data storage medium containing profiles of a plurality of users in a network;

a non-transitory second data storage medium containing a relationship index between some of the users wherein the relationship index is determined based, at least in part, upon a degree of a correspondence relationship between two users, the degree of the correspondence relationship having been set by at least one of the two users; and a search module configured for searching for at least one route connecting a first user to a second user in the social network based, at least in part, upon links which connect nodes and the relationship indexes of the links and for evaluating each of the searched routes based, at least in part, upon the relationship indexes of the links which form said respective searched routes, wherein at least some of the nodes are the users and each of the links is a virtual connection path between two users who have correspondence relationship, wherein evaluating comprises calculating cost of the searched routes in accordance with total weights of the links which form each route and upon selection of a route among the evaluated routes by the first user, charging the cost of the selected route to the first user's account, wherein the weight is inversely proportional to the relationship index of the respective link between two nodes having the correspondence relationship, and wherein the cost of the selected route comprises an amount paid to a third user when the first user sends an invitation message for a new relationship to the second user via a third user having correspondence relationships with both the first user and the second user.

* * * * *